(12) United States Patent
Strater, Jr. et al.

(10) Patent No.: US 9,727,816 B1
(45) Date of Patent: Aug. 8, 2017

(54) ASYNCHRONOUS SMART CARD ENCODE AND PRINT APPARATUS AND METHOD IN A HETEROGENEOUS CHIP-CARD PRODUCTION ENVIRONMENT

(71) Applicants: William H. Strater, Jr., Vero Beach, FL (US); Markus Portmann, Vero Beach, FL (US)

(72) Inventors: William H. Strater, Jr., Vero Beach, FL (US); Markus Portmann, Vero Beach, FL (US)

( * ) Notice: Subject to any disclaimer, the term of this patent is extended or adjusted under 35 U.S.C. 154(b) by 0 days.

(21) Appl. No.: 15/193,131

(22) Filed: Jun. 27, 2016

(51) Int. Cl.
*G06K 19/06* (2006.01)
*G06K 19/077* (2006.01)
*G06K 7/00* (2006.01)

(52) U.S. Cl.
CPC ..... *G06K 19/07769* (2013.01); *G06K 7/0004* (2013.01)

(58) Field of Classification Search
CPC .................................. G06K 19/0723
USPC ....................................... 235/492
See application file for complete search history.

(56) References Cited

U.S. PATENT DOCUMENTS

2010/0188244 A1* 7/2010 Sattler .................. B01L 3/545
340/686.1

* cited by examiner

*Primary Examiner* — Jamara Franklin
(74) *Attorney, Agent, or Firm* — Raj Abhyanker, P.C.

(57) ABSTRACT

In one embodiment, chip-cards are fed from conveyor canisters individually into an array of N heterogeneous encoding assemblies of a heterogeneous chip-card production apparatus. Each chip-card is associated with a user account based on a database. Smart chips and magnetic stripes of the chip-cards are encoded asynchronously, electrically and magnetically by the N assemblies with N independent timing protocols for the N assemblies. Encoded chip-cards are deposited asynchronously in parallel by the N assemblies onto a conveyor belt and transported asynchronously and serially to a chip-card printer. The chip-card printer synchronizes each encoded chip-card with associated user account and prints on a surface of the encoded chip-card based on the associated user account. Parallel verification, serial verification-registration, and/or vision-based verification may be performed to verify and ensure consistency among printed text, patterns, custom labeling, magnetic encoded data, electrical encoded data, and associated user accounts. Faulty cards may be identified/rejected.

20 Claims, 5 Drawing Sheets

ASYNCHRONOUS SMART CARD ENCODE AND PRINT APPARATUS AND METHOD IN A HETEROGENEOUS CHIP-CARD PRODUCTION ENVIRONMENT

FIELD OF TECHNOLOGY

This disclosure relates generally to printing and, more particularly, to an asynchronous smart card encode and print apparatus and method in a heterogeneous chip-card production environment.

BACKGROUND

A smart card, chip-card, and/or integrated circuit card (ICC) may be any pocket-sized card that may include an embedded integrated circuit (IC) chip that may be either a secure microcontroller and/or equivalent intelligence with internal memory and/or a memory chip alone. Smart cards may be made of plastic (e.g., polyvinyl chloride). Smart cards may be also constructed from polyethylene terephthalate based polyesters, acrylonitrile butadiene styrene and/or polycarbonate. The ICC may connect to a reader with direct physical contact and/or with a remote contactless radio frequency interface. With an embedded microcontroller, the ICC may have an ability to store a substantial amount of data. The ICC may carry out their own on-card functions (e.g., encryption and/or mutual authentication) and/or interact intelligently with a smart card reader. Smart card technology may conform to international standards (ISO/IEC 7816 and ISO/IEC 14443) and/or may be available in a variety of form factors, including plastic cards, fobs, subscriber identity modules (SIMs) used in GSM mobile phones, and/or USB-based tokens.

There may be two categories of smart cards: contact and/or contactless. A contact smart card may be inserted into a smart card reader with a direct connection to a conductive contact plate on the surface of the card (typically gold plated). Transmission of commands, data, and/or card status may take place over these physical contact points. A contactless card may require only close proximity to a reader. Both the reader and/or the card may have antennae, and/or may communicate using radio frequencies (electromagnetic signal) over this contactless link. Most contactless cards may derive power for the internal chip from this electromagnetic signal. The range may be one-half to three inches for non-battery-powered cards, which may be suitable for applications such as building entry and/or payment that may benefit from a very fast card interface.

The chips used in these cards may fall into two categories: microcontroller chips and memory chips. A memory chip may be like a small floppy disk with optional security. Memory chips may be less expensive than microcontrollers but with a corresponding decrease in data management security. Cards that use memory chips may depend on the security of the card reader for processing and may be suitable for situations that require low or medium security.

A microcontroller chip may add, delete, and otherwise manipulate information in its memory. A microcontroller may be like a miniature computer, with an input/output port, operating system, and hard disk. Smart cards with an embedded microcontroller may have the ability to store considerable amounts of data, carry out their own on-card functions (e.g., encryption and digital signatures) and interact intelligently with a smart card reader.

Smart cards may be used in many applications worldwide, including: (a) Secure identity applications—employee ID badges, citizen ID documents, electronic passports, driver's licenses, online authentication devices; (b) Healthcare applications—citizen health ID cards, physician ID cards, portable medical records cards; (c) Payment applications—contact and contactless credit/debit cards, transit payment cards; and/or (d) Telecommunications applications—GSM Subscriber Identity Modules, pre-paid telephone cards.

Also important may be the allowance of "Flat Cards" which may mean the embossed characters that were previously mandated may no longer be needed. This may open up the possibility to print the card with inkjet technology which may be flexible, and/or customer friendly. Such printed smart cards may be custom made on demand with short turn-around time or in front of the customers. More creative variations on the artistic design of the smart cards may be possible.

A smart card may have a magnetic stripe similar to the traditional credit/debit cards for backward compatibility. For a blank smart card (with embedded chip and/or magnetic stripe to be encoded, and/or the user account information to be printed), three operations may need to be performed: encoding the chip of the smart card using a chip encoder, encoding the magnetic stripe of the smart card using a magnetic encoder, and/or printing on the surfaces of the smart card. One challenge may be that the time to encode the chip in a smart card may be many times longer than the time to encode the magnetic strip and/or to inkjet print. Another challenge may be that the UV LED DOD Printer needed for printing on the smart card may be very expensive relative to the Chip encoding module.

A straightforward tendon configuration with a slow chip encoder, a fast magnetic encoder followed by a fast inkjet printer may not work well because the expensive inkjet printer may tend to be under-utilized, which may be cost prohibitive.

To match the speed of the expensive fast inkjet print, multiple slow encoders may need to be used in parallel, with associated challenges.

SUMMARY

Disclosed are asynchronous smart card encode and print apparatus and method in a heterogeneous chip-card production environment.

In one aspect, a heterogeneous chip-card production apparatus includes a chip-card production controller with a processor and a memory communicatively coupled with the processor. The chip-card production controller detects a presence of a sequence of chip-cards in a conveyor canister of a chip-card encoding array. The chip-card encoding array includes 'n' number of heterogeneous encoding assemblies arranged along a conveyor belt of a chip-card conveyor transport. The chip-card production controller associates one of a plurality of user accounts with each chip-card of the conveyer canister based on a cardholder database and/or a custom labeling on a face of each chip-card.

The heterogeneous chip-card production apparatus also includes the chip-card encoding array which includes the 'n' number of heterogeneous encoding assemblies communicatively coupled to the chip-card production controller. The chip-card encoding array automatically feeds each of the chip-cards in the conveyor canister and/or the other conveyor canisters into one of the heterogeneous encoding assemblies, which is at a base of each of the conveyor canister and/or the other conveyor canisters. The chip-cards are differentiated through the custom labeling on the chip-cards.

The chip-card encoding array encodes asynchronously a smart chip of each of the chip-cards in the conveyor canister and/or the other conveyor canisters associated with each of the plurality of user accounts. The encoding is performed through one of the heterogeneous encoding assemblies at the base of each of the conveyor canister and/or the other conveyor canisters.

The chip-card encoding array encodes electrically a smart chip of each of the chip-cards in the conveyor canister and/or the other conveyor canisters associated with each of the plurality of user accounts. The electrical encoding is performed through one of the heterogeneous encoding assemblies at the base of each of the conveyor canister and/or the other conveyor canisters.

The chip-card encoding array also encodes asynchronously a magnetic stripe of each of the chip-cards in the conveyor canister and/or the other conveyor canisters associated with each of the plurality of user accounts. The encoding is performed through one of the heterogeneous encoding assemblies at the base of each of the conveyor canister and/or the other conveyor canisters.

The chip-card encoding array also encodes magnetically a magnetic stripe of each of the chip-cards in the conveyor canister and/or the other conveyor canisters associated with each of the plurality of user accounts. The magnetic encoding is performed through one of the heterogeneous encoding assemblies at the base of each of the conveyor canister and/or the other conveyor canisters.

The chip-card encoding array identifies a first faulty chip-card and rejects the first faulty chip-card.

The chip-card encoding array deposits asynchronously the encoded chip-cards in parallel onto the conveyor belt of the chip-card conveyor transport.

The heterogeneous chip-card production apparatus also includes the chip-card conveyor transport communicatively coupled with the chip-card production controller. The chip-card conveyor transport collects the encoded chip-cards deposited asynchronously in a parallel manner from the 'n' number of heterogeneous encoding assemblies using the conveyor belt. The chip-card conveyor transport moves the encoded chip-cards asynchronously in a serial manner using the conveyor belt to a chip-card printer. The chip-card conveyor transport identifies a second faulty chip-card and rejects the second faulty chip-card.

The heterogeneous chip-card production apparatus also includes the chip-card printer communicatively coupled to the chip-card production controller. The chip-card printer receives the encoded chip-cards from the chip-card conveyor transport asynchronously in a serial manner. The chip-card printer synchronizes a particular encoded chip-card with a particular user account, and/or prints on a surface of the particular encoded chip-card based on the particular user account. The chip-card printer identifies a third faulty chip-card and rejects the third faulty chip-card.

The chip-card production controller may count a number of chip-cards in the conveyor canister and/or other conveyor canisters associated with the 'n' number of heterogeneous encoding assemblies.

The chip-card encoding array may utilize a first set of 'n' number of independent and asynchronous timing protocols for the 'n' number of heterogeneous encoding assemblies. In the first set of timing protocols, electrical encoding operations of one encoding assembly may commence independent of other encoding assemblies at a first rate independent of other encoding assemblies.

The chip-card encoding array may utilize a second set of 'n' number of independent and asynchronous timing protocols for the 'n' number of heterogeneous encoding assemblies. In the second set of timing protocols, magnetic encoding operations of one encoding assembly may commence independent of other encoding assemblies at a second rate independent of other encoding assemblies.

The chip-card encoding array may utilize a third set of 'n' number of independent and asynchronous timing protocols for the 'n' number of heterogeneous encoding assemblies. In the third set of timing protocols, depositing operations of one heterogeneous encoding assembly may commence independent of other encoding assemblies at a third rate independent of other encoding assemblies.

The chip-card encoding array may also identify faulty chip-cards using a parallel verification process.

The chip-card conveyor transport may identify faulty chip-cards using a serial verification-registration process. The chip-card conveyor transport may increment a counter when one of the chip-cards is determined to be faulty. The chip-card conveyor transport may move the encoded chip-cards to the chip-card printer, except those that are determined to be faulty, jammed and/or lost in transport. The chip-card conveyor transport may utilize a fourth timing protocol in which the encoded chip-cards reach the chip-card printer in a serial manner asynchronously at irregular time intervals.

The heterogeneous chip-card production apparatus may include a chip-card verification array, which may include 'n' number of heterogeneous verification apparatuses associated with the 'n' number of heterogeneous encoding assemblies. The 'n' number of heterogeneous verification apparatuses may be communicatively coupled with the chip-card production controller.

The 'n' number of heterogeneous verification apparatuses may perform a parallel verification process before the encoded chip-cards are deposited onto the conveyor belt by performing the following. They may communicate asynchronously with the smart chips of the encoded chip-cards, and/or verify asynchronously the electrical encoded data in the smart chips of the encoded chip-cards based on the associated user accounts. They may read asynchronously the magnetic stripes of the encoded chip-cards, and/or verify asynchronously the magnetic encoded data in the magnetic stripes of the encoded chip-cards based on the associated user accounts. They may verify asynchronously that the electrical encoded data and/or the magnetic encoded data may be consistent based on the associated user accounts. They may also determine asynchronously any encoded chip-cards failing any verification to be faulty.

The heterogeneous chip-card production apparatus may include a serial verification-registration apparatus communicatively coupled with the chip-card production controller. The serial verification-registration apparatus may perform a serial verification-registration process after the encoded chip-cards are deposited onto the conveyor belt by doing the following. The serial verification-registration apparatus may read the magnetic stripes of the encoded chip-cards and/or also communicate with the smart chips of the encoded chip-cards, as the encoded chip-cards may be moved by the conveyor belt asynchronously with irregular spacing and/or irregular time interval between consecutive encoded chip-cards. The serial verification-registration apparatus may identify the associated user accounts based on the magnetic encoded data in the magnetic stripes and/or the electrical encoded data in the smart chips, and/or register the encoded chip-cards based on the associated user accounts. The serial verification-registration apparatus may determine any encoded chip-cards failing the registration to be faulty.

The chip-card production controller may track the physical locations of the encoded chip-cards. The chip-card production controller may also re-identify the encoded chip-cards based on a registration of the encoded chip-cards, as the encoded chip-cards may be moved on the conveyor belt.

The chip-card conveyor transport may rotate the encoded chip-cards horizontally by an angle relative to the conveyor belt using at least one bum turn, align the encoded chip-cards against a reference edge of the conveyor belt, and/or flip the encoded chip-cards upside down using a turnover station.

The chip-card printer may synchronize the particular encoded chip-card with the particular user account based on a registration of the particular encoded chip-card. The chip-card printer may also cure the printed surface of the particular encoded chip-card with UV (ultra-violet) light after the printing.

The heterogeneous chip-card production apparatus may include a vision-based verification apparatus communicatively coupled with the chip-card production controller. The vision-based verification apparatus may capture images of the encoded chip-cards using a camera system after the printing by the chip-card printer.

The vision-based verification apparatus may verify the appearance of the encoded chip-cards and/or the printing by the chip-card printer based on computer vision applied to the captured images and/or the associated user accounts. It may determine printed text, patterns and/or custom labeling on the encoded chip-cards by performing OCR (optical character recognition) and/or bar-code extraction on the captured images. It may verify the printed text, the patterns and/or the custom labeling on the encoded chip-cards based on the associated user accounts. It may ensure data integrity by synchronizing the printed text, the patterns and/or the custom labeling with the magnetic encoded data of the magnetic stripes and/or the electrical encoded data of the smart chips of the encoded chip-cards.

The vision-based verification apparatus may reject any encoded chip-cards with blemish in the printed text, the patterns, the custom labeling, the magnetic encoded data and/or the electrical encoded data.

A first encoded chip-card may cease to reach the chip-card printer because of rejection due to unsuccessful communication with a first smart chip of the first encoded chip-card, rejection due to unsuccessful encoding of the first smart chip, rejection due to unsuccessful encoding of a first magnetic stripe of the first encoded chip-card, halted operation due to unsuccessful communication with the chip-card production controller, halted operation due to unavailability of a first associated user account, jamming of the first encoded chip-card, and/or getting lost of the first encoded chip-card in transport.

A second encoded chip-card may be rejected based on rejection of the second encoded chip-card by a chip-card verification array, rejection by a serial verification-registration apparatus, rejection by a vision-based verification apparatus, rejection by the chip-card production controller, jamming of the second encoded chip-card, and/or getting lost of the second encoded chip-card in transport.

The heterogeneous chip-card production apparatus may include at least one heterogeneous encoding assembly halted and/or removed asynchronously from the chip-card encoding array while the other heterogeneous encoding assemblies, the chip-card production controller, the conveyor transport and/or the chip-card printer may remain in operation.

The heterogeneous chip-card production apparatus may include at least one new heterogeneous encoding assembly added to the chip-card encoding array and/or commenced asynchronously while the 'n' number of heterogeneous encoding assemblies of the chip-card encoding array, the chip-card production controller, the chip-card conveyor transport, and/or the chip-card printer may remain in operation.

The heterogeneous chip-card production apparatus may include at least one heterogeneous encoding assembly modified asynchronously on the fly while the other heterogeneous encoding assemblies, the chip-card production controller, the chip-card conveyor transport, and/or the chip-card printer may remain in operation. The modification may be slowing down, speeding up, halting, resuming, turning on, turning off, multi-tasking, replenishing, rebooting, software upgrade, software update, and/or an other operation.

In another aspect, a heterogeneous chip-card production apparatus includes a chip-card encoding array which includes 'n' number of heterogeneous encoding assemblies arranged along a conveyor belt of a chip-card conveyor transport and communicatively coupled to a chip-card production controller. The chip-card encoding array automatically feeds chip-cards in conveyor canisters of the chip-card encoding array individually into one of the heterogeneous encoding assemblies at a base of each of the conveyor canisters using a processor and a memory of the chip-card production controller. The chip-cards are differentiated through custom labeling on a face of each of the chip-cards. One of a plurality of user accounts is associated with each of the chip-cards based on a cardholder database and/or the custom labeling.

The chip-card encoding array encodes asynchronously and electrically a smart chip of each of the chip-cards in the conveyor canisters associated with each of the plurality of user accounts through one of the heterogeneous encoding assemblies at the base of each of the conveyor canisters. The chip-card encoding array also encodes asynchronously and magnetically a magnetic stripe of each of the chip-cards in the conveyor canisters associated with each of the plurality of user accounts through one of the heterogeneous encoding assemblies at the base of each of the conveyor canisters. The chip-card encoding array deposits asynchronously the encoded chip-cards in parallel onto the conveyor belt of the chip-card conveyor transport.

The heterogeneous chip-card production apparatus also includes the chip-card printer communicatively coupled to the chip-card production controller. The chip-card printer synchronizes a particular encoded chip-card transported asynchronously in a serial manner from the chip-card encoding array using the conveyor belt of the chip-card conveyor transport with a particular user account and print on a surface of the particular encoded chip-card based on the particular user account.

In the heterogeneous chip-card production apparatus, encoded chip-cards determined to be faulty are rejected.

In yet another aspect, a method of a heterogeneous chip-card production apparatus includes automatically feeding chip-cards individually in conveyor canisters of a chip-card encoding array including 'n' number of heterogeneous encoding assemblies into one of heterogeneous encoding assemblies at a base of each of the conveyor canisters. The 'n' number of heterogeneous encoding assemblies are communicatively coupled with a chip-card production controller and are arranged along a conveyor belt of a chip-card conveyor transport. The chip-cards are differentiated through custom labeling on a face of each of the chip-cards.

One of a plurality of user accounts is associated with each of the chip-cards based on a cardholder database and the custom labeling.

The method of the heterogeneous chip-card production apparatus also includes encoding asynchronously and/or electrically a smart chip of each of the chip-cards in the conveyor canisters associated with each of the plurality of user accounts. The encoding is through one of the heterogeneous encoding assemblies at the base of each of the conveyor canisters.

The method of the heterogeneous chip-card production apparatus also includes encoding asynchronously and/or magnetically a magnetic stripe of each of the chip-cards in the conveyor canisters associated with each of the plurality of user accounts, through one of the heterogeneous encoding assemblies at the base of each of the conveyor canisters.

The method further includes depositing asynchronously the encoded chip-cards in parallel from the 'n' number of heterogeneous encoding assemblies onto the conveyor belt of the chip-card conveyor transport, which is communicatively coupled with the chip-card production controller.

The method includes rejecting any encoded chip-cards that are determined to be faulty.

The method includes collecting the encoded chip-cards, deposited asynchronously in a parallel manner from the 'n' number of heterogeneous encoding assemblies, using the conveyor belt of the chip-card conveyor transport. The method includes moving the encoded chip-cards asynchronously in a serial manner using the conveyor belt of the chip-card conveyor transport to a chip-card printer communicatively coupled to the chip-card production controller.

The method further includes synchronizing a particular encoded chip-card with a particular user account using the chip-card printer, and/or printing on a surface of the particular encoded chip-card using the chip-card printer based on the particular user account.

The methods and devices disclosed herein may be implemented in any means for achieving the various aspects, and may be executed in the form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
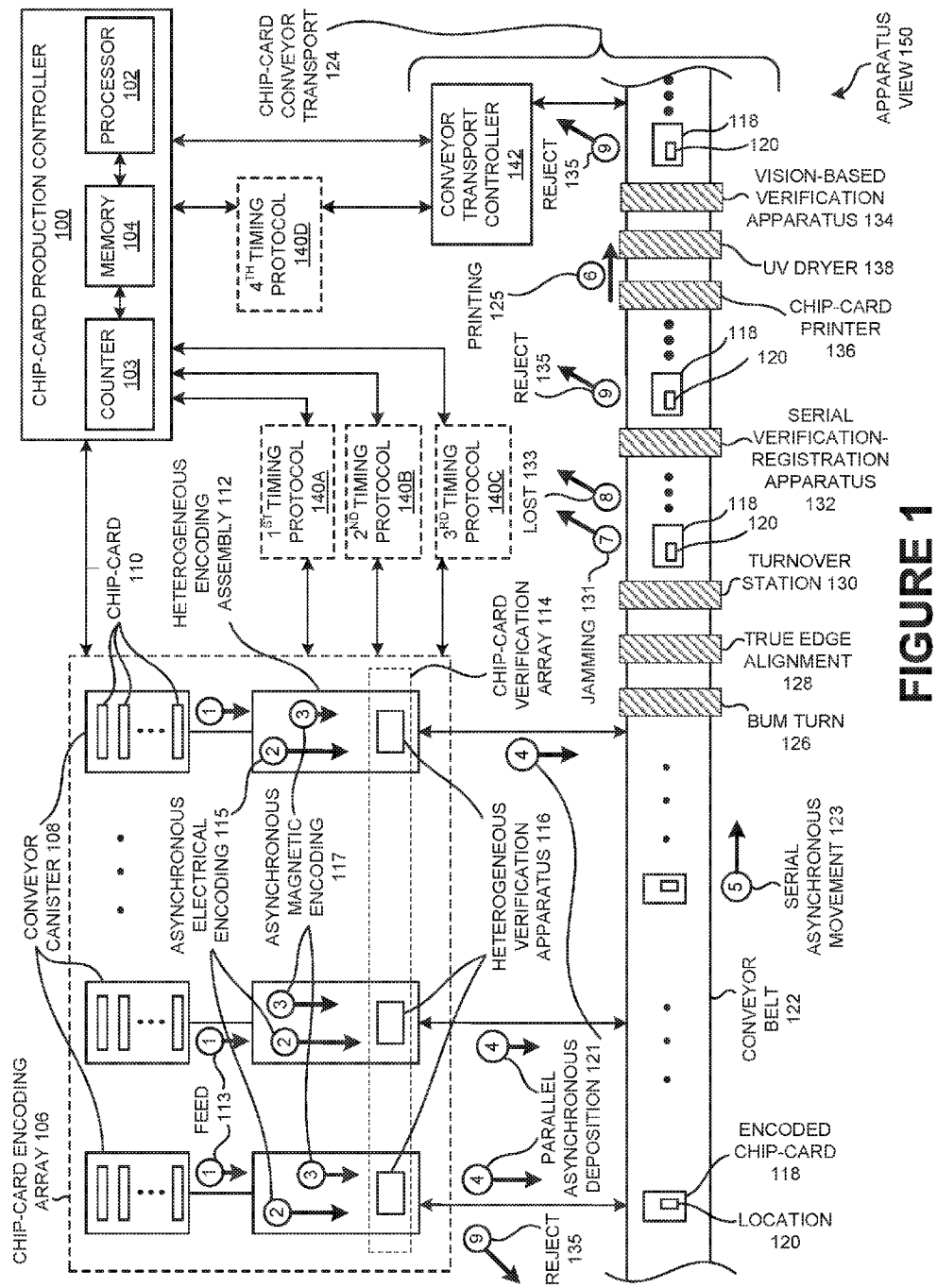
FIG. 1 is an apparatus view of a heterogeneous chip-card production apparatus to encode chip-cards asynchronously in parallel using heterogeneous encoding assemblies of a chip-card encoding array, to move encoded chip-cards serially using a conveyor belt of chip-card conveyor transport, and to print on surfaces of the chip-cards using a chip-card printer, according to one embodiment.

Other features of the present embodiments will be apparent from the accompanying drawings and from the detailed description that follows.

DETAILED DESCRIPTION

Disclosed are asynchronous smart card encode and print apparatus and method in a heterogeneous chip-card production environment.

In one embodiment, a heterogeneous chip-card production apparatus includes a chip-card production controller 100 with a processor 102 and a memory 104 communicatively coupled with the processor 102. The chip-card production controller 100 detects a presence of a sequence of chip-cards 110 in a conveyor canister 108 of a chip-card encoding array 106. The chip-card encoding array 106 includes 'n' number of heterogeneous encoding assemblies 112 arranged along a conveyor belt 122 of a chip-card conveyor transport 124. The chip-card production controller 100 associates (e.g., using association 304) one of a plurality of user accounts 302 with each chip-card 110 of the conveyer canister 108 based on a cardholder database 300 and/or a custom labeling 202 on a face of each chip-card 110.

The heterogeneous chip-card production apparatus also includes the chip-card encoding array 106 which includes the 'n' number of heterogeneous encoding assemblies 112 communicatively coupled to the chip-card production controller 100. The chip-card encoding array 106 automatically feeds (e.g., using feed 113) each of the chip-cards 110 in the conveyor canister 108 and/or the other conveyor canisters 108 into one of the heterogeneous encoding assemblies, which is at a base of each of the conveyor canister 108 and/or the other conveyor canisters 108. The chip-cards 110 are differentiated through the custom labeling 202 on the chip-cards 110.

The chip-card encoding array 106 encodes asynchronously a smart chip 204 of each of the chip-cards 110 in the conveyor canister 108 and/or the other conveyor canisters 108 associated with each of the plurality of user accounts 302. The encoding is performed through one of the heterogeneous encoding assemblies 112 at the base of each of the conveyor canister 108 and/or the other conveyor canisters 108.

The chip-card encoding array 106 encodes electrically a smart chip 204 of each of the chip-cards 110 in the conveyor canister 108 and/or the other conveyor canisters 108 associated with each of the plurality of user accounts 302. The electrical encoding is performed through one of the heterogeneous encoding assemblies 112 at the base of each of the conveyor canister 108 and/or the other conveyor canisters 108.

The chip-card encoding array 106 also encodes asynchronously a magnetic stripe 206 of each of the chip-cards 110 in the conveyor canister 108 and/or the other conveyor canisters 108 associated with each of the plurality of user accounts 302. The encoding is performed through one of the heterogeneous encoding assemblies 112 at the base of each of the conveyor canister 108 and/or the other conveyor canisters 108.

The chip-card encoding array 106 also encodes magnetically a magnetic stripe 206 of each of the chip-cards 110 in the conveyor canister 108 and/or the other conveyor canisters 108 associated with each of the plurality of user accounts 302. The magnetic encoding (e.g., asynchronous magnetic encoding 117) is performed through one of the heterogeneous encoding assemblies 112 at the base of each of the conveyor canister 108 and/or the other conveyor canisters 108.

The chip-card encoding array 106 identifies a first faulty chip-card 110 and rejects the first faulty chip-card 110 (e.g., using reject 135).

The chip-card encoding array 106 deposits asynchronously the encoded chip-cards 118 in parallel onto the conveyor belt 122 of the chip-card conveyor transport 124.

The heterogeneous chip-card production apparatus also includes the chip-card conveyor transport 124 communicatively coupled with the chip-card production controller 100. The chip-card conveyor transport 124 collects the encoded chip-cards 118 deposited asynchronously in a parallel manner from the 'n' number of heterogeneous encoding assemblies 112 using the conveyor belt 122. The chip-card conveyor transport 124 moves the encoded chip-cards 118 asynchronously in a serial manner (e.g., serial asynchronous movement 123) using the conveyor belt 122 to a chip-card printer 136. The chip-card conveyor transport 124 identifies a second faulty chip-card 110 and rejects the second faulty chip-card 110 (e.g., using reject 135).

The heterogeneous chip-card production apparatus also includes the chip-card printer 136 communicatively coupled to the chip-card production controller 100. The chip-card printer 136 receives the encoded chip-cards 118 from the chip-card conveyor transport 124 asynchronously in a serial manner. The chip-card printer 136 synchronizes a particular encoded chip-card 118 with a particular user account 302, and/or prints on a surface of the particular encoded chip-card 118 based on the particular user account 302. The chip-card printer 136 identifies a third faulty chip-card 110 and rejects the third faulty chip-card 110 (e.g., using reject 135).

The chip-card production controller 100 may count a number of chip-cards 110 in the conveyor canister 108 and/or other conveyor canisters 108 associated with the 'n' number of heterogeneous encoding assemblies 112.

The chip-card encoding array 106 may utilize a first set of 'n' number of independent and asynchronous timing protocols for the 'n' number of heterogeneous encoding assemblies 112. In the first set of timing protocols 140A, electrical-encoding operations (e.g., asynchronous electrical encoding 115) of one encoding assembly may commence independent of other encoding assemblies at a first rate independent of other encoding assemblies.

The chip-card encoding array 106 may utilize a second set of 'n' number of independent and asynchronous timing protocols for the 'n' number of heterogeneous encoding assemblies 112. In the second set of timing protocols 140B, magnetic encoding operations (e.g., asynchronous magnetic encoding 117) of one encoding assembly may commence independent of other encoding assemblies at a second rate independent of other encoding assemblies.

The chip-card encoding array 106 may utilize a third set of 'n' number of independent and asynchronous timing protocols for the 'n' number of heterogeneous encoding assemblies 112. In the third set of timing protocols 140C, depositing operations of one heterogeneous encoding assembly 112 may commence independent of other encoding assemblies at a third rate independent of other encoding assemblies.

The chip-card encoding array 106 may also identify faulty chip-cards 110 using a parallel verification process.

The chip-card conveyor transport 124 may identify faulty chip-cards 110 using a serial verification-registration process (e.g., by using serial verification-registration apparatus 132). The chip-card conveyor transport 124 may increment a counter 103 when one of the chip-cards 110 is determined to be faulty. The chip-card conveyor transport 124 may move the encoded chip-cards 118 to the chip-card printer 136, except those that are determined to be faulty, jammed (e.g., jamming 131) and/or lost 133 in transport. The chip-card conveyor transport 124 may utilize a fourth timing protocol 140D in which the encoded chip-cards 118 reach the chip-card printer 136 in a serial manner asynchronously at irregular time intervals.

The heterogeneous chip-card production apparatus may include a chip-card verification array 114, which may include 'n' number of heterogeneous verification apparatuses 116 associated with the 'n' number of heterogeneous encoding assemblies 112. The 'n' number of heterogeneous verification apparatuses 116 may be communicatively coupled with the chip-card production controller 100.

The 'n' number of heterogeneous verification apparatuses 116 may perform a parallel verification process before the encoded chip-cards 118 are deposited onto the conveyor belt 122 by performing the following. They may communicate asynchronously with the smart chips 204 of the encoded chip-cards 118, and/or verify asynchronously the electrical encoded data in the smart chips 204 of the encoded chip-cards 118 based on the associated user accounts 302. They may read asynchronously the magnetic stripes 206 of the encoded chip-cards 118, and/or verify asynchronously the magnetic encoded data in the magnetic stripes 206 of the encoded chip-cards 118 based on the associated user accounts 302. They may verify asynchronously that the electrical encoded data and/or the magnetic encoded data may be consistent based on the associated user accounts 302. They may also determine asynchronously any encoded chip-cards 118 failing any verification to be faulty.

The heterogeneous chip-card production apparatus may include a serial verification-registration apparatus 132 communicatively coupled with the chip-card production controller 100. The serial verification-registration apparatus 132 may perform a serial verification-registration process after the encoded chip-cards 118 are deposited onto the conveyor belt 122 by doing the following. The serial verification-registration apparatus 132 may read the magnetic stripes 206 of the encoded chip-cards 118 and/or also communicate with the smart chips 204 of the encoded chip-cards 118, as the encoded chip-cards 118 may be moved by the conveyor belt 122 asynchronously with irregular spacing and/or irregular time interval between consecutive encoded chip-cards 118. The serial verification-registration apparatus 132 may identify the associated user accounts 302 based on the magnetic encoded data in the magnetic stripes 206 and/or the electrical encoded data in the smart chips 204, and/or register the encoded chip-cards 118 based on the associated user accounts 302. The serial verification-registration apparatus 132 may determine any encoded chip-cards 118 failing the verification-registration to be faulty.

The chip-card production controller 100 may track the physical locations (e.g., location 120) of the encoded chip-cards 118. The chip-card production controller 100 may also re-identify the encoded chip-cards 118 based on a registration of the encoded chip-cards 118, as the encoded chip-cards 118 may be moved on the conveyor belt 122.

The chip-card conveyor transport 124 may rotate the encoded chip-cards 118 horizontally by an angle (e.g. 90 degree) relative to the conveyor belt 122 using at least one bum turn 126, align the encoded chip-cards 118 against a reference edge (e.g., true edge alignment 128) of the conveyor belt 122, and/or flip the encoded chip-cards 118 upside down using a turnover station 130.

The chip-card printer 136 may synchronize the particular encoded chip-card 118 with the particular user accounts 302 based on a registration of the particular encoded chip-card 118. The chip-card printer 136 may also cure the printed surface of the particular encoded chip-card 118 with UV (ultra-violet) light (e.g., using UV dryer 138) after the printing 125.

The heterogeneous chip-card production apparatus may include a vision-based verification apparatus 134 communicatively coupled with the chip-card production controller 100. The vision-based verification apparatus 134 may capture images of the encoded chip-cards 118 using a camera system after the printing 125 by the chip-card printer 136.

The vision-based verification apparatus 134 may verify the appearance of the encoded chip-cards 118 and/or the printing 125 by the chip-card printer 136 based on computer vision applied to the captured images and/or the associated user accounts 302. It may determine printed text 210, patterns and/or custom labeling 202 on the encoded chip-cards 118 by performing OCR (optical character recognition) and/or bar-code extraction on the captured images. It may verify the printed text 210, the patterns and/or the custom labeling 202 on the encoded chip-cards 118 based on the associated user accounts 302. It may ensure data integrity by synchronizing the printed text 210, the patterns and/or the custom labeling 202 with the magnetic encoded data of the magnetic stripes 206 and/or the electrical encoded data of the smart chips 204 of the encoded chip-cards 118.

The vision-based verification apparatus 134 may reject 135 any encoded chip-cards 118 with blemish 212 in the printed text 210, the patterns, the custom labeling 202, the magnetic encoded data and/or the electrical encoded data.

A first encoded chip-card may cease to reach the chip-card printer 136 because of rejection due to unsuccessful communication with a first smart chip 204 of the first encoded chip-card, rejection due to unsuccessful encoding of the first smart chip 204, rejection due to unsuccessful encoding of a first magnetic stripe 206 of the first encoded chip-card 118, halted operation due to unsuccessful communication with the chip-card production controller 100, halted operation due to unavailability of a first associated user account 302, jamming 131 of the first encoded chip-card 118, getting lost 133 of the first encoded chip-card 118 in transport, and/or other operations/situations/reasons.

A second encoded chip-card 118 may be rejected based on rejection of the second encoded chip-card 118 by a chip-card verification array 114, rejection by a serial verification-registration apparatus 132, rejection by a vision-based verification apparatus 134, rejection by the chip-card production controller 100, jamming 131 of the second encoded chip-card 118, getting lost 133 of the second encoded chip-card 118 in transport, and/or other operations/situations/reasons.

The heterogeneous chip-card production apparatus may include at least one heterogeneous encoding assembly 112 halted and/or removed asynchronously from the chip-card encoding array 106 while the other heterogeneous encoding assemblies 112, the chip-card production controller 100, the chip-card conveyor transport 124 and/or the chip-card printer 136 may remain in operation.

The heterogeneous chip-card production apparatus may include at least one new heterogeneous encoding assembly 112 added to the chip-card encoding array 106 and/or commenced asynchronously while the 'n' number of heterogeneous encoding assemblies 112 of the chip-card encoding array 106, the chip-card production controller 100, the chip-card conveyor transport 124, and/or the chip-card printer 136 may remain in operation.

The heterogeneous chip-card production apparatus may include at least one heterogeneous encoding assembly 112 modified asynchronously on the fly while the other heterogeneous encoding assemblies 112, the chip-card production controller 100, the chip-card conveyor transport 124, and/or the chip-card printer 136 may remain in operation. The modification may be slowing down, speeding up, halting, resuming, turning on, turning off, multi-tasking, replenishing, rebooting, software upgrade, software update, and/or an other operation.

In another embodiment, a heterogeneous chip-card production apparatus includes a chip-card encoding array 106 which includes 'n' number of heterogeneous encoding assemblies 112 arranged along a conveyor belt 122 of a chip-card conveyor transport 124 and communicatively coupled to a chip-card production controller 100. The chip-card encoding array 106 automatically feeds (e.g., using feed 113) chip-cards 110 in conveyor canisters 108 of the chip-card encoding array 106 individually into one of the heterogeneous encoding assemblies 112 at a base of each of the conveyor canisters 108 using a processor 102 and a memory 104 of the chip-card production controller 100. The chip-cards 110 are differentiated through custom labeling 202 on a face of each of the chip-cards 110. One of a plurality of user accounts 302 is associated with each of the chip-cards 110 based on a cardholder database 300 and/or the custom labeling 202.

The chip-card encoding array 106 encodes asynchronously and electrically a smart chip 204 of each of the chip-cards 110 in the conveyor canisters 108 associated with each of the plurality of user accounts 302 through one of the heterogeneous encoding assemblies 112 at the base of each of the conveyor canisters 108. The chip-card encoding array 106 also encodes asynchronously and magnetically a magnetic stripe 206 of each of the chip-cards 110 in the conveyor canisters 108 associated with each of the plurality of user accounts 302 through one of the heterogeneous encoding assemblies 112 at the base of each of the conveyor canisters 108. The chip-card encoding array 106 deposits asynchronously the encoded chip-cards 118 in parallel onto the conveyor belt 122 of the chip-card conveyor transport 124.

The heterogeneous chip-card production apparatus also includes the chip-card printer 136 communicatively coupled to the chip-card production controller 100. The chip-card printer 136 synchronizes a particular encoded chip-card 118 transported asynchronously in a serial manner from the chip-card encoding array 106 using the conveyor belt 122 of the chip-card conveyor transport 124 with a particular user account 302 and print on a surface of the particular encoded chip-card 118 based on the particular user account 302.

In the heterogeneous chip-card production apparatus, encoded chip-cards 118 determined to be faulty are rejected (e.g. using reject 135).

In yet another embodiment, a method of a heterogeneous chip-card production apparatus includes automatically feeding chip-cards 110 (e.g., using feed 113 in circle "1") individually in conveyor canisters 108 of a chip-card encoding array 106 including 'n' number of heterogeneous encoding assemblies 112 into one of heterogeneous encoding assemblies 112 at a base of each of the conveyor canisters 108. The 'n' number of heterogeneous encoding assemblies 112 are communicatively coupled with a chip-card production controller 100 and are arranged along a conveyor belt 122 of a chip-card conveyor transport 124. The chip-cards 110 are differentiated through custom labeling 202 on a face of each of the chip-cards 110. One of a plurality of user accounts 302 is associated with each of the chip-cards 110 based on a cardholder database 300 and the custom labeling 202.

The method of the heterogeneous chip-card production apparatus also includes encoding asynchronously and/or electrically (e.g. using asynchronous electrical encoding 115 in circle "2") a smart chip 204 of each of the chip-cards 110 in the conveyor canisters 108 associated with each of the plurality of user accounts 302. The encoding is through one of the heterogeneous encoding assemblies 112 at the base of each of the conveyor canisters 108.

The method of the heterogeneous chip-card production apparatus also includes encoding asynchronously and/or magnetically (e.g. using asynchronous magnetic encoding 117 in circle "3") a magnetic stripe 206 of each of the chip-cards 110 in the conveyor canisters 108 associated with each of the plurality of user accounts 302, through one of the heterogeneous encoding assemblies 112 at the base of each of the conveyor canisters 108.

The method further includes depositing asynchronously the encoded chip-cards 118 in parallel (using parallel asynchronous deposition 121 in circle "4") from the 'n' number of heterogeneous encoding assemblies 112 onto the conveyor belt 122 of the chip-card conveyor transport 124, which is communicatively coupled with the chip-card production controller 100.

The method rejects (e.g. using reject 135 in circle "9") any encoded chip-cards 110 that are determined to be faulty.

The method includes collecting the encoded chip-cards 118, deposited asynchronously in a parallel manner from the 'n' number of heterogeneous encoding assemblies 112, using the conveyor belt 122 of the chip-card conveyor transport 124. The method includes moving the encoded chip-cards 118 asynchronously in a serial manner using the conveyor belt 122 of the chip-card conveyor transport 124 to a chip-card printer 136 communicatively coupled to the chip-card production controller 100.

The method further includes synchronizing a particular encoded chip-card 118 with a particular user account 302 using the chip-card printer 136, and/or printing 125 on a surface (e.g. top face of chip-card 200A and/or bottom face of chip-card 200B) of the particular encoded chip-card 118 using the chip-card printer 136 based on the particular user account 302.

FIG. 1 is an apparatus view 150 of a heterogeneous chip-card production apparatus to encode chip-cards asynchronously in parallel using heterogeneous encoding assemblies 112 of a chip-card encoding array 106, to move encoded chip-cards 118 serially using a conveyor belt 122 of chip-card conveyor transport 124, and to print on surfaces of the chip-cards 110 using a chip-card printer 136, according to one embodiment.

Particular, FIG. 1 shows a chip-card production controller 100, a processor 102, a counter 103, a memory 104, a chip-card encoding array 106, conveyor canister 108, chip-card 110, heterogeneous encoding assembly 112, feed 113, chip-card verification array 114, asynchronous electrical encoding 115, heterogeneous verification apparatus 116, asynchronous magnetic encoding 117, encoded chip-card 118, location 120, parallel asynchronous deposition 121, conveyor belt 122, serial asynchronous movement 123, chip-card conveyor transport 124, printing 125, bum turn 126, true edge alignment 128, turnover station 130, jamming 131, serial verification-registration apparatus 132, lost 133, vision-based verification apparatus 134, reject 135, chip-card printer 136, UV dryer 138, first/second/third/fourth timing protocols 140A/140B/140C/140D, and conveyor transport controller 142.

The heterogeneous chip-card production apparatus may include four main components: a chip-card production controller 100, a chip-card encoding array 106, a chip-card conveyor transport 124, and a chip-card printer 136.

The chip-card production controller 100 may include a processor 102, a memory 104 communicatively coupled to the processor 102, and a counter 103. The chip-card production controller 100 may communicate with the chip-card encoding array 106, the chip-card verification array 114, the chip-card conveyor transport 124, the serial verification-registration apparatus 132, the vision-based verification apparatus 134, the chip-card printer 136, and/or the UV dryer 138.

The chip-card production controller 100 may initiate, control, track, manage, synchronize, verify, accept, reject, and/or oversee the following:

(a) the feeding of the chip-cards 110 from the conveyor canisters 108 to the heterogeneous encoding assemblies 112 in parallel (e.g., using feed 113 in circle "1"), (b) asynchronous encoding of the smart chips 204 and the magnetic stripe 206 of the chip-cards 110 based on associated user accounts 302 and custom labeling 202 in parallel using the chip-card encoding array 106 (e.g., using asynchronous electrical encoding 115 in circle "2" and/or asynchronous magnetic encoding 117 in circle "3"), (c) asynchronous verification of the electrical encoded data in the smart chips 204 and the magnetic encoded data in the magnetic stripes 206 of the encoded chip-cards 118 based on the associated user accounts 302 (e.g. using chip-card verification array 114, serial verification-registration apparatus 132, vision-based verification apparatus 134), (d) asynchronous deposition of the encoded chip-cards 118 onto the conveyor belt 122 of the chip-card conveyor transport 124 in parallel by the heterogeneous encoding assemblies 112 (e.g., using parallel asynchronous deposition 121 in circle "4"), (e) transport of the encoded chip-cards 118 with associated locations 120 to the chip-card printer 136 in a serial manner by the conveyor belt 122 of chip-card conveyor transport 124 (e.g., using serial asynchronous movement 123 in circle "5"), (f) synchronization of the encoded chip-cards 110 with associated user accounts 302 (e.g. using serial verification-registration apparatus 132), (g) printing on surfaces of the encoded chip-cards 118 using the chip-card printer 136 (e.g., using printing 125 in circle "6"), (h) verification of encoded chip-cards 118 (e.g., parallel verification using the chip-card verification array 114, serial verification using the serial verification-registration apparatus 132, and/or vision-based verification using the vision-based verification apparatus 134), and/or (i) rejection of encoded chip-cards 118 determined to be faulty (e.g., using reject 135 of circle "9").

The chip-card production controller 100 may associate one of a plurality of user accounts 302 of a cardholder database 300 with each chip-card (e.g., using association 304).

The chip-card encoding array 106 may include 'n' number of heterogeneous encoding assembly 112 and/or conveyor canisters 108. The chip-card encoding array 106 may be communicatively coupled with the chip-card production controller 100. The heterogeneous encoding assemblies 112 may electrically encode (e.g., asynchronous electrical encoding 115 in circle "2") the smart chips (e.g., smart chip 204) and magnetically encode (e.g., asynchronous magnetic encoding 117 in circle "3") the magnetic stripes (e.g., magnetic stripe 206) of chip-cards 110. Each heterogeneous encoding assembly 112 may be associated with a conveyor canister 108 which may feed 113 chip-cards 110 individually into the heterogeneous encoding assembly 112. Each heterogeneous encoding assembly 112 may also deposit encoded chip-cards 118 onto a conveyor belt 122 of the chip-card conveyor transport 124.

The chip-card conveyor transport 124 may include a conveyor belt 122, a conveyor transport controller 142, bum turn 126, true edge alignment 128, and/or turnover station 130 for the transport of the encoded chip-cards 118 from the chip-card encoding array 106 to the chip-card printer 136.

The chip-card printer 136 may be associated with a UV dryer 138 to print (e.g., printing 125 in circle "6") on a surface (e.g. top face of chip-card 200A, and/or bottom face of chip-card 200B) of each chip-card 110 and to cure the printing 125 (e.g., using UV dryer 138).

A heterogeneous verification apparatus 116 of a chip-card verification array 114 may be associated with a heterogeneous encoding assembly 112 to perform parallel verification of the encoded chip-cards 118 to ensure that the magnetic encoded data in the magnetic stripe 206 and electrical encoded data in the smart chip 204 in a chip-card 110 are accurately encoded and are consistent based on an associated user account 302.

A serial verification-registration apparatus 132 may be associated with the chip-card conveyor transport 124 and the chip-card printer 136 to perform serial verification and registration of each encoded chip-card 118 to identify/re-identify, verify and/or register the encoded chip-card 118 and the associated user account 302.

A vision-based verification apparatus 134 may be associated with the chip-card conveyor transport 124 and the chip-card printer 136 to perform vision-based verification/registration to verify, identify, and/or register the encoded chip-card 118 based on printed text 210, printed pattern 208B, custom labeling pattern 208A, and/or blemish 212 in images of the chip-card 110 captured before and/or after the printing 125 in circle "6" by the chip-card printer 136, and the associated user account 302.

The chip-card production controller 100 may issue commands to and collect feedbacks from the chip-card encoding array 106, the chip-card conveyor transport 124, the chip-card printer 136, the chip-card verification array 114, the serial verification-registration apparatus 132, and the vision-based verification apparatus 134 for a chip-card production run of making certain amount of chip-cards 110 with associated user accounts 302 and corresponding custom labeling 202. The chip-card production controller 100 may be communicatively coupled with the chip-card encoding array 106, the chip-card conveyor transport 124, the chip-card printer 136, the UV dryer 138, the chip-card verification array 114, the serial verification-registration apparatus 132, and/or the vision-based verification apparatus 134.

During the chip-card production run, the chip-card production controller 100 may monitor the operations of the chip-card encoding array 106, the chip-card conveyor transport 124, the chip-card printer 136, the chip-card verification array 114, the serial verification-registration apparatus 132, and vision-based verification apparatus 134. The chip-card production controller 100 may detect a presence of chip-cards 110 in the conveyor canisters 108.

The chip-card production controller 100 may associate user accounts 302 with the chip-cards 110. One user account 302 may be associated with one chip-card 110. A user account 302 may also be associated with two or more chip-cards 110, as a user may apply for supplementary cards for his/her relatives (e.g. one card for a spouse, and/or one card for a teenage son/daughter), and/or a user may apply for multiple cards simultaneously (e.g. a Chase Freedom® card, a Chase Slate® card and/or a Chase Sapphire® card). Each of the two or more associated chip-cards 110 may need to be printed individually as they are different/distinct cards.

All the chip-cards 110 in all the conveyor canister 108 may be totally committed/associated with the user accounts 302. Sometimes, the production run may be small such that only some of the chip-cards 110 in the conveyor canisters 108 are to be used. Sometimes, some conveyor canisters (and the associated heterogeneous encoding assemblies 112) may be used (i.e. active) while the rest of the conveyor canisters 108 and the associated heterogeneous encoding assemblies 112 may be inactive.

The conveyor canisters 108 may hold chip-cards 110 with different custom labeling 202. In an example embodiment, one conveyor canister 108 may hold chip-cards 110 with custom labeling 202 for a type of VISA® (e.g. Chase Freedom®), another conveyor canister 108 may hold chip-cards 110 with custom labeling 202 for another type of VISA® (e.g. Chase Slate®), while another conveyor canister 108 may hold chip-cards 110 with custom labeling 202 for Master Card®, and yet another may hold chip-cards 110 with custom labeling 202 for American Express®. A user account 302 associated with a type of card (e.g. Chase Freedom®) must use a chip-card 110 from the conveyor canisters 108 corresponding to that type of card (e.g. with Chase Freedom® custom labeling 202). The custom labeling 202 may include custom background color and/or artwork (e.g., custom labeling pattern 208A) of the card, custom logos (e.g., custom labeling pattern 208A, VISA® logo, MasterCard® logo, American Express® logo, logo of issuing organization, logo of the type of card, etc.), and/or custom text (e.g., printed text 210, "VISA"®, "Master-Card"®, "American Express"®, "Chase Freedom"®, "Bank XYZ", "in pursuit of excellence", "cardholder since 15", "valid through", "Cirrus"®, "24 hour customer service 1-800-xxx-yyyy", name of the type of card, etc.).

In another example embodiment, chip-cards 110 with different custom labeling 202 may be mixed in the same conveyor canister 108. Vision-based techniques (e.g., a variation of that used in vision-based verification apparatus 134) and/or other techniques may be employed to recognize and register the chip-cards 110 with the different custom labeling 202 before the association 304 with user accounts is performed and/or established.

The smart chip 204 of the chip-card 110 may be a microcontroller chip or a memory chip. The chip-card 110 may be a contact card and/or a contactless card. The chip-card 110 may be an EMV®-compatible smart card. The chip-card 110 may have custom labeling 202 and/or custom labeling pattern 208A already printed on the surfaces (e.g. top face of chip-card 200A and/or bottom face of chip-card 200B) before being placed in the convey canisters 108.

The heterogeneous encoding assemblies 112 may be commercially available printers for chip-cards 110. The 'n' number of heterogeneous encoding assemblies 112 may be heterogeneous, of different brands, and/or different models, with different feeding, electrical reading, electrical encoding, magnetic reading, magnetic encoding, depositing, and/or rejection characteristics. The brand of a heterogeneous encoding assembly 112 may be Datacard®, Pointman®, Magtek®, Zebra®, NBS Technologies®, Evolis®, Raco®, and other brands. The models of the heterogeneous encoding assemblies 112 may be different also. In particular, it may be a Pointman® model TD1R21R-MIRW dispenser+card reader & writer of brand Pointman®.

The conveyor belt 122 may be a carrying medium of a belt conveyor system. The conveyor belt 122 may consists of two or more pulleys (or drums), with an endless loop of carrying medium, the convey belt, that rotates about them. One or both of the pulleys are powered, moving the belt and the material on the belt forward. The powered pulley is called the drive pulley while the unpowered pulley is called the idler pulley.

The chip-card printer 136 may be commercially available, with many possible brands, such as Datacard®, Evolis®, Fargo®, IDP®, Magicard®, Nisca®, Zebra®. It may be a single-sided chip-card printer 136. It may also be a double-sided chip-card printer 136. It may laminate the chip-card 110. It may use retransfer printing technology. It may be a high volume, standard volume and/or low volume chip-card printer.

In the chip-card production run, in circle "1", chip-cards 110 in the conveyor canisters 108 are fed individually into the heterogeneous encoding assemblies 112. The feeding among the 'n' number of heterogeneous encoding assemblies 112 may be asynchronous, occurring at a time independent of other heterogeneous encoding assemblies 112 at a rate independent of other heterogeneous encoding assemblies 112.

In circle "2", asynchronous electrical encoding 115 of the smart chips 204 of the chip-cards 110 is performed by the heterogeneous encoding assemblies 112. Communication with the chip-cards 110 may first be established using a contact or contactless communication (radio frequency). Authentication and encryption may be used for secure communication. The electrical encoding is asynchronous because different heterogeneous encoding assemblies 112 perform the operations independently. The asynchronous electrical encoding 115 may utilize a first 'n' number of independent and asynchronous timing protocol (e.g., timing protocol 140A) in which the electrical encoding operations of one heterogeneous encoding assembly 112 commence independent of other encoding assemblies 112 at a first rate (possibly irregular) independent of other encoding assemblies.

In circle "3", asynchronous magnetic encoding 117 of the magnetic stripes 206 of the chip-cards 110 is performed also by the heterogeneous encoding assemblies 112. The magnetic encoding is asynchronous because different heterogeneous encoding assemblies 112 perform the operations independently. The asynchronous magnetic encoding 117 may utilize a second 'n' number of independent and asynchronous timing protocol (e.g., second timing protocol 140B) in which the magnetic encoding operations of one heterogeneous encoding assembly 112 commences independent of other encoding assemblies at a second rate independent of other encoding assemblies.

Within a heterogeneous encoding assembly 112, the asynchronous electric encoding 115 and the asynchronous magnetic encoding 117 may commence at different time.

A chip-card 110 failing the asynchronous electrical encoding 115 and/or the asynchronous magnetic encoding 117 may be determined to be faulty, and may be rejected (e.g., reject 135) in circle "9". A faulty chip-card 110 may be rejected by the chip-card encoding array 106. A faulty chip-card 110 may also be rejected along the conveyor belt 122 either before or after the printing by the chip-card printer 136. The chip-card printer 136 may skip printing for the faulty chip-cards that pass through it.

After the asynchronous electric encoding 115 in circle "2" and the asynchronous magnetic encoding 117 in circle "3", the encoded chip-cards 118 may be verified in the chip-card verification array 114. The chip-card verification array 114 may include 'n' number of heterogeneous verification apparatuses 116 associated with the 'n' number of heterogeneous encoding assemblies 112. Each heterogeneous verification apparatus 116 may communicate asynchronously with the smart chips 204 of the encoded chip-cards 118 and may verify asynchronously the electrical encoded data in the smart chips 204 of the encoded chip-cards 118 based on the associated user accounts 302. Each heterogeneous verification apparatus 116 may also read asynchronously with the magnetic stripes 206 of the encoded chip-cards 118 and verify asynchronously the magnetic encoded data in the magnetic stripes 206 of the encoded chip-cards 118 based on the associated user accounts 302. Each heterogeneous verification apparatus 116 may verify asynchronously that the electrical encoded data and the magnetic encoded data are consistent based on the associated user accounts 302. Any encoded chip-cards 118 failing the verification may be determined to be faulty and may be rejected (e.g., reject 135) in circle "9". Rejected chip-cards may be collected in one or more collection bin(s).

The counter 103 may be used to keep track of chip-cards 110 that are faulty, and/or otherwise failed to reach the chip-card printer 136 (e.g., due to jamming 131 in circle "7" and/or due to lost 133 in circle "8"). The chip-card production controller 100 may issue new commands to the chip-card encoding array 106, the chip-card conveyor transport 124, and the chip-card printer 136 to re-make those chip-cards 110. The re-making command may be issued without waiting so that the re-making task is merged with the current and/or the next runs of making chip-cards 110. Alternatively, the re-making command may be issued after waiting some time so that a certain amount of unsuccessful chip-cards 110 (e.g., 500) can be re-made in a new run, and/or in the same run.

The chip-card encoding array 106 may deposit the encoded chip-cards 118 in parallel onto a conveyor belt 122 for transport (e.g., serial asynchronous movement 123 in circle "5") to the chip-card printer 136. In circle "4", parallel asynchronous deposition 121 is done by the chip-card encoding array 106 of 'n' heterogeneous encoding assemblies 112. It is done in parallel as the heterogeneous encoding assemblies 112 are depositing in parallel, without waiting for other heterogeneous encoding assemblies 112. It may use a third timing protocol 140C to include a third set of 'n' number of independent and asynchronous timing protocols for the 'n" number of heterogeneous encoding assemblies 112. The depositing operations of one heterogeneous encoding assembly 112 may commence independent of other encoding assemblies at a third rate independent of other encoding assemblies.

In circle "5", the encoded chip-cards 118 deposited in parallel by the heterogeneous encoding assembly 112 may be moved in a serial asynchronous movement 123. The conveyor belt 122 effectively performs a parallel-to-serial conversion mechanically. The spacing among consecutive encoded chip-cards 118 may be irregular. The chip-card conveyor transport 124 may utilize a fourth timing protocol 140D in which the encoded chip-cards 118 may reach the chip-card printer 136 in a serial manner asynchronously at irregular time intervals.

When initially deposited, the encoded chip-cards 118 may have their magnetic stripes 206 at an angle (e.g., approximately 90 degrees, i.e., perpendicular) to the serial asynchronous movement 123 of the encoded chip-cards 118 on the conveyor belt 122, which is inconvenient for high-speed magnetic reading (e.g., to be performed in the serial verification-registration apparatus 132). The encoded chip-cards 118 may be rotated horizontally for an angle (e.g., 90 degrees) using bum turns 126 so that the magnetic stripes 206 of the encoded chip-cards are roughly aligned. The encoded chip-cards 118 may further be aligned against a true edge (e.g., true edge alignment 128) of the conveyor belt 122. The encoded chip-cards 118 may be flipped upside-down using a turnover station 130, so that printing 125 on the top face of the chip-card 200A and/or the bottom face of chip-card 200B is possible. The movement of the conveyor belt 122, the bum turn 126, the true edge alignment 128 and turnover station 130 of the chip-card conveyor transport 124 may be controlled by the conveyor transport controller 142 in communication with the chip-card production controller 100.

Because of the parallel asynchronous deposition 121 of encoded chip-cards 118 onto the conveyor belt 122, there is some uncertainty in the identity of the encoded chip-cards 118 as they are moved on the conveyor belt. The serial verification-registration apparatus 132 may re-identify, and/or register (and/or re-synchronize with) the encoded chip-cards 118 by reading the magnetic stripes 206 of the encoded chip-cards 118 and checking the magnetic encoded data in the magnetic stripe 206 against the cardholder database 300 to find the associated user accounts 302. The aligned magnetic stripes 206 by the combination of bum turns 126, true edge alignment 128 and/or turnover station 130 may make high-speed reading of the magnetic stripes 206 possible.

Alternatively, the serial verification-registration apparatus 132 may re-identify, and/or register (and/or re-synchronize with) the encoded chip-cards 118 by communicating with the smart chips 204 of the encoded chip-cards 118 and checking the electrical encoded data in the smart chips 204 against the cardholder database 300 to find the associated user accounts 302. The alignment by the combination of bum turns 126, true edge alignment 128 and/or turnover station 130 may help in the high-speed communication (contact or contactless) with the smart chips 204 possible.

In circle "6", the chip-card printer 136 performs printing 125 on a surface of the encoded chip-card 118 (e.g., top face of chip-card 200A and/or bottom face of chip-card 200B) with an associated UV dryer 138 to cure the printing. The chip-card printer 136 may print on two sides (e.g., both the top face of chip-card 200A and bottom face of chip-card 200B) of the encoded chip-card 118. The chip-card printer 136 may print on one side (e.g., top face of chip-card 200A) of the encoded chip-card 118, send the encoded chip-card 118 to the turnover station 130 and print on the other side (e.g., bottom face of chip-card 200B) of the encoded chip-card 118.

The printing 125 may include printed text 210 and printed pattern 208B. The printed text 210 may include user name, and other user personal information (e.g. address, phone number, etc.). The printed text 210 may also include an identifiable number (e.g., credit card number, debit card number, payment account number, staff number, membership number, social security number, driver license number, etc.), and associated information (e.g. expiration date, starting date of membership/staff/driver license, etc).

A vision-based verification apparatus 134 may be used to analyze captured images of the encoded chip-cards 118 using computer vision techniques to identify and recognize printed text 210 (e.g., card number, user name, expiration date, and/or other user/card information, etc.) and/or patterns (e.g., printed pattern 208B, bar-code, and/or custom labeling pattern 208A) and to compare with associated user accounts to ensure integrity and consistency among the printed data, the magnetic encoded data and the electrical encoded data. Any encoded chip-cards 118 with visible blemish 212 (e.g., incorrect/incomplete/unclear/smeared printed text and/or printed pattern, incorrect/incomplete/unclear/smeared bar-code, incorrect color, incorrect background pattern/background artwork, etc.).

Any encoded chip-card 118 failing any verification (e.g., parallel verification by the chip-card verification array 114, serial verification by the serial verification-registration apparatus 132, visual verification by the vision-based verification apparatus 134) may be determined to be faulty. Faulty encoded chip-cards 118 may be rejected at some point during the whole chip-card encoding and printing process. Some other chip-cards 110 may be lost due to jamming 131 and/or lost 133.

The chip-card production controller 100 may track each chip-card 110 and detect whether the encoding and/or printing of the chip-card 110 is successful. Faulty chip-cards 110 may be re-made (re-encoded and re-printed) in either the current run or a future run.

Figure 2:
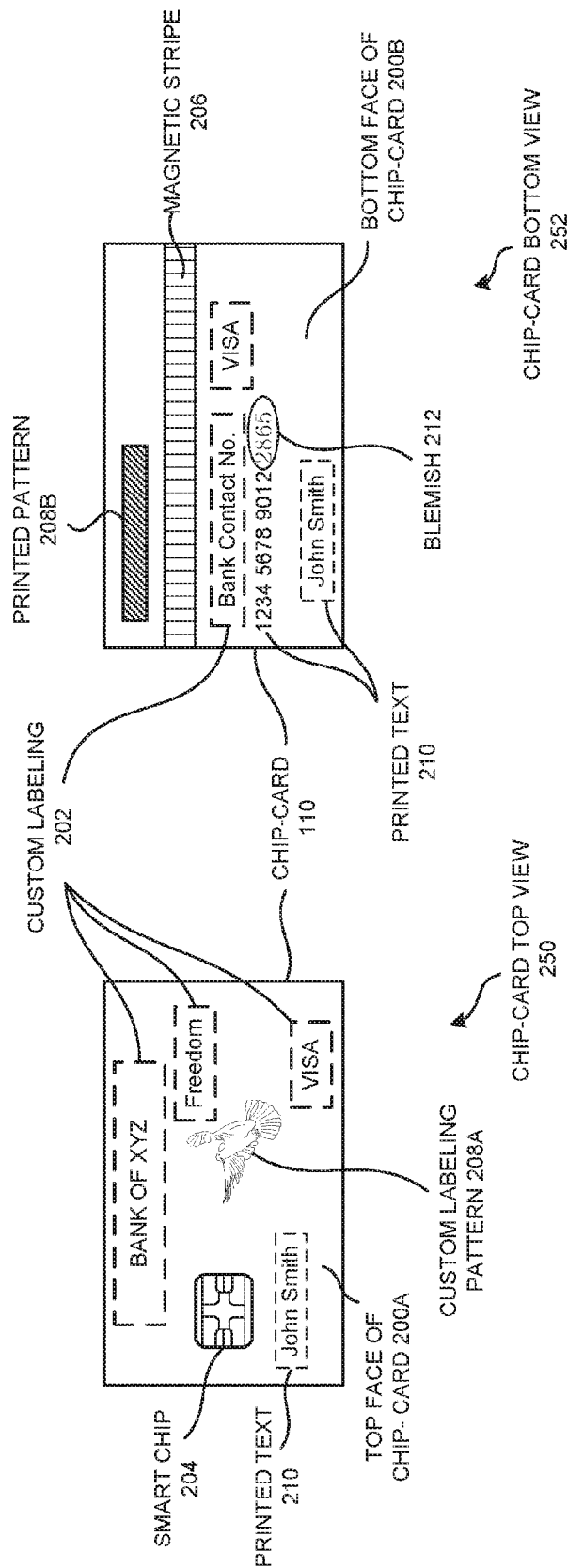
FIG. 2A is a chip-card top view illustrating a smart chip, a custom labeling, a custom labeling pattern, and a printed text on the top face of a chip-card of FIG. 1, according to one embodiment.
FIG. 2B is a chip-card bottom view illustrating a magnetic stripe, custom labeling, a printed pattern, a printed text and a blemish on the bottom face of a chip-card of FIG. 1, according to one embodiment.

FIG. 2A is a chip-card top view 250 illustrating a smart chip 204, custom labeling 202, a custom labeling pattern 208A, and a printed text 210 on the top face of a chip-card 200A of FIG. 1, according to one embodiment.

The format factors of the chip-card 110 may be determined by international and/or industry standards. The top face of chip-card 200A may include the smart chip 204, custom labeling 202, custom labeling patterns 208A, printed text 210 and printed pattern 208B. The smart chip 204 may provide terminals for contact communication. A contactless smart chip 204 may have antenna that enables contactless communication using wireless communication technology.

The custom labeling 202 may include custom background color and/or artwork (e.g., custom labeling pattern 208A) of the card, custom logos (e.g., custom labeling pattern 208A, VISA® logo, MasterCard® logo, American Express® logo, logo of issuing organization, logo of the type of card, etc.), and/or custom text (e.g., printed text 210, "VISA"®, "MasterCard"®, "American Express"®, "Chase Freedom"®, "Bank XYZ", "in pursuit of excellence", "cardholder since 15", "valid through", "Cirrus"®, "24 hour customer service 1-800-xxx-yyyy", name of the type of card, etc.).

The printed text 210 may include user name, and other user personal information (e.g., address, phone number, etc.). The printed text 210 may also include an identifiable number (e.g., credit card number, debit card number, payment account number, staff number, membership number, social security number, driver license number, etc.), and associated information (e.g., expiration date, starting date of membership/staff/driver license, etc.). The printed pattern 208B may include bar-code, an image, an image of the user, special symbols, card-specific logos and patterns.

FIG. 2B is a chip-card bottom view 252 illustrating a magnetic stripe 206, custom labeling 202, a printed pattern 208B, a printed text 210 and a blemish 212 on the bottom face of a chip-card 200B of FIG. 1, according to one embodiment.

The bottom face of chip-card 200A may include the magnetic stripe 206, custom labeling 202, custom labeling patterns 208A, printed text. The magnetic stripe 206 may be called magstripe and is made up of tiny iron-based magnetic particles in a plastic-like film, which can be read by a magnetic reading head. Each particle is a very tiny bar magnet. The magstripe can be encoded or "written" because the tiny bar magnets can be magnetized in either a north or south pole direction. The magnetic stripe can be used to store data. The physical properties of the card, including size, flexibility, location of the magstripe, magnetic characteristics, and data format are defined in international standards such as ISO/IEC 7810, ISO/IEC 7811, ISO/IEC 7812, ISO/IEC 7813, ISO 8583 and ISO/IEC 4909. They also provide the standards for financial cards, including the allocation of card number ranges to different card issuing institutions.

The custom labeling 202 may include custom background color and/or artwork (e.g., custom labeling pattern 208A) of the card, custom logos (e.g. custom labeling pattern 208A, VISA® logo, MasterCard® logo, American Express® logo, logo of issuing organization, logo of the type of card, etc.), and/or custom text (e.g., printed text 210, "VISA"®, "MasterCard"®, "American Express"®, "Chase Freedom"®, "Bank XYZ", "in pursuit of excellence", "cardholder since 15", "valid through", "Cirrus"®, "24 hour customer service 1-800-xxx-yyyy", name of the type of card, etc.).

The printed text 210 may include user name, and other user personal information (e.g., address, phone number, etc.). The printed text 210 may also include an identifiable number (e.g., credit card number, debit card number, payment account number, staff number, membership number, social security number, driver license number, etc.), and associated information (e.g., expiration date, starting date of membership/staff/driver license, etc.).

Figure 3:
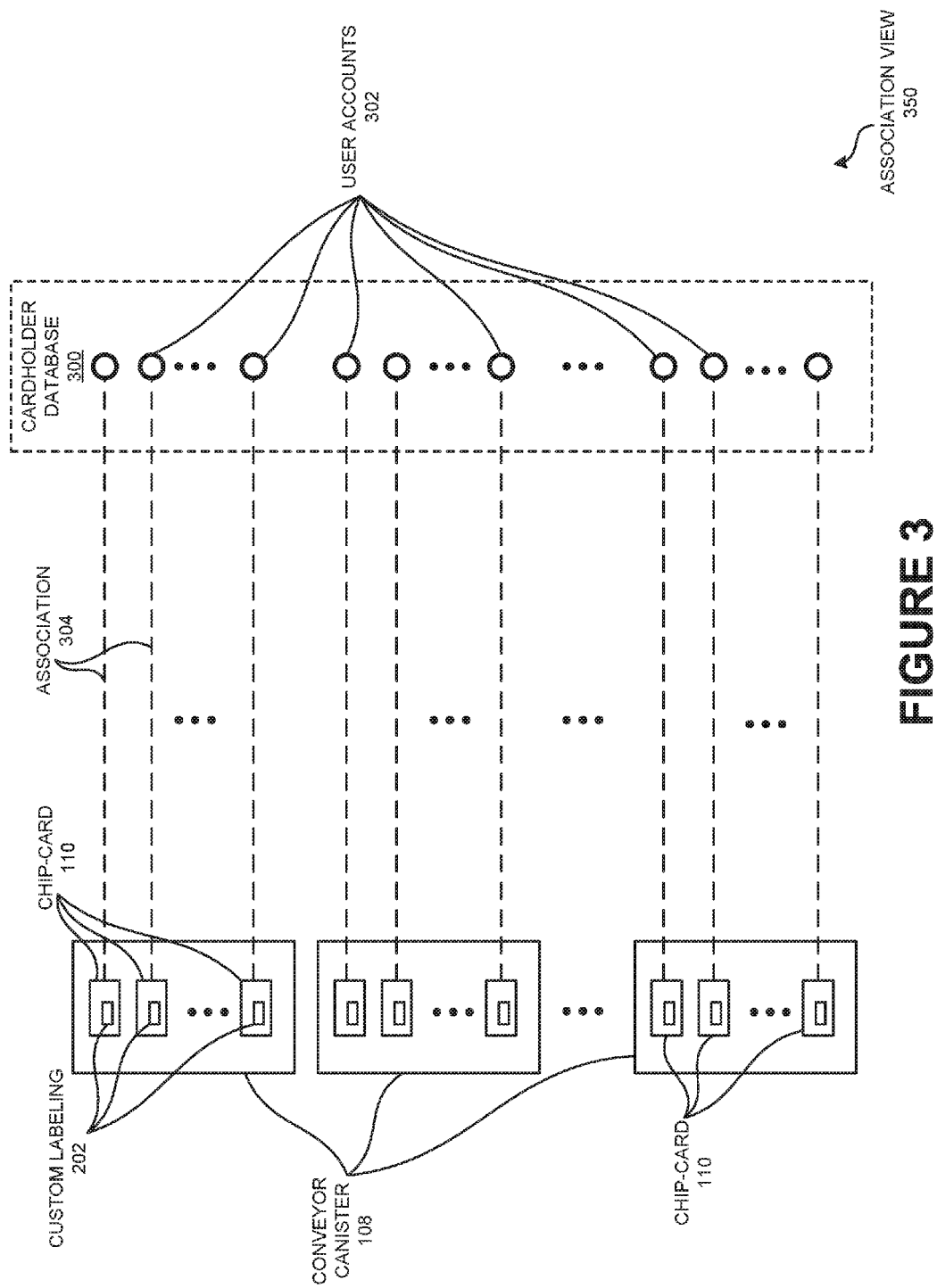
FIG. 3 is an association view illustrating the association of a user account with each chip-card of FIG. 1 based on a cardholder database and a custom labeling on a face of each chip-card, according to one embodiment.

FIG. 3 is an association view 350 illustrating the association of a user account 302 with each chip-card 110 of FIG. 1 based on a cardholder database 300 and a custom labeling 202 on a face of each chip-card 110, according to one embodiment.

A cardholder database 300 may include the list of user accounts 302 associated with the chip-cards 110 to be printed. One chip-card 110 is associated with a user account 302. The user account 302 in the cardholder database 300 may include user information (e.g., user name, address, phone number, driver license number, social security number, and/or membership number, etc.) and card information (e.g., card number, membership number, expiration date, SSV code, starting data of membership, etc., card type, custom labeling) related to the chip-card 110 to be printed. The user account may be used to provide the electrical encoded data for the smart chips 204 of the chip-cards 110 in the asynchronous electrical encoding 115 in circle "2", the magnetic encoded data for the magnetic stripes 206 of the chip-cards in the asynchronous magnetic encoding 117 in circle "3", and the printed text 210 and/or patterns of the chip-cards 110 for the printing 125 in circle "6".

Figure 4:
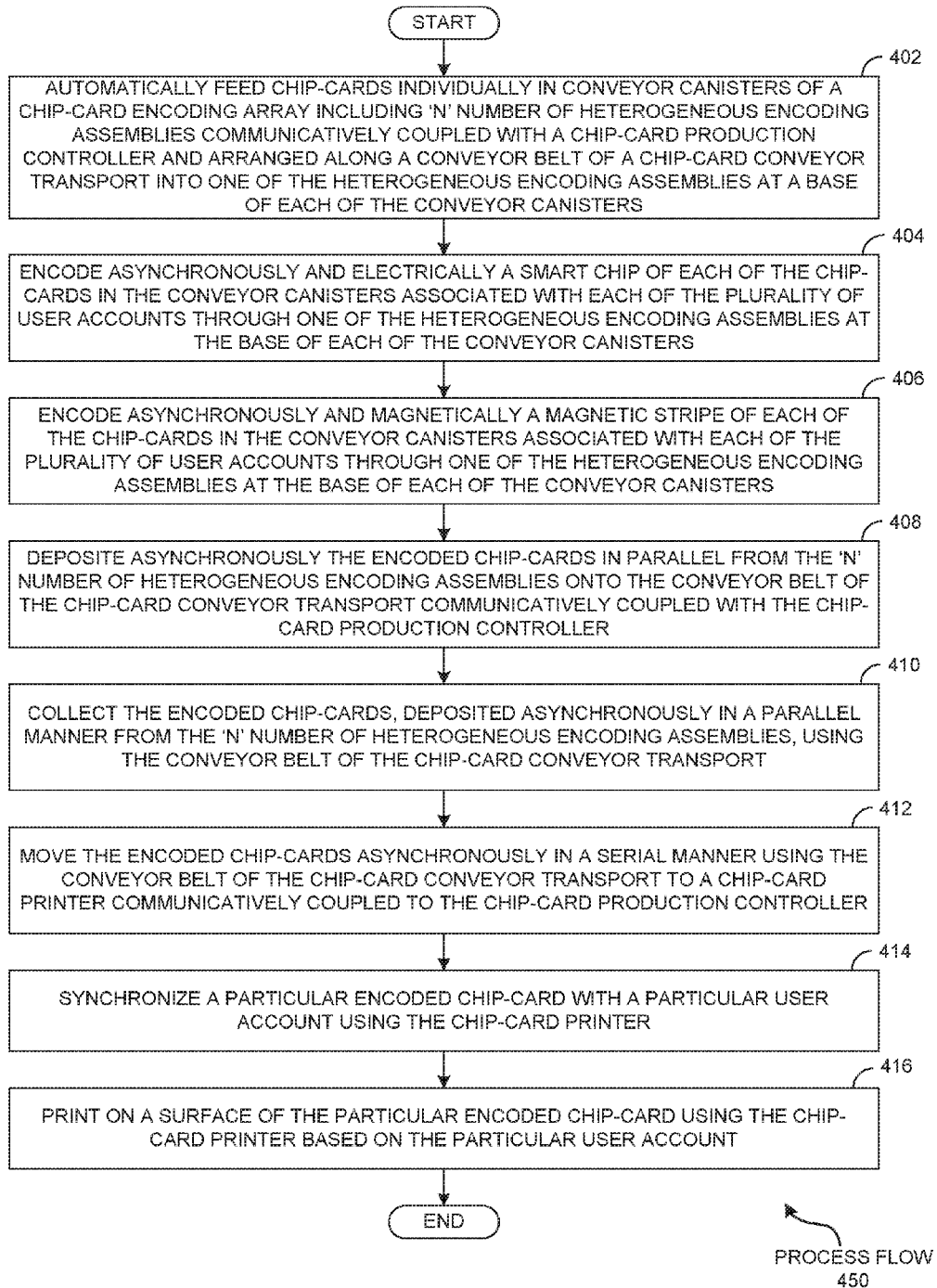
FIG. 4 is a process flow of the encoding of smart chips and magnetic stripes of chip-cards using heterogeneous encoding assemblies, the moving of encoded chip-cards using a conveyor belt, and the printing on surfaces of synchronized encoded chip-cards using a chip-card printer, according to one embodiment.

FIG. 4 is a process flow 450 of the encoding of smart chips 204 and magnetic stripes 206 of chip-cards 110 using heterogeneous encoding assemblies 112, the moving of encoded chip-cards 118 using a conveyor belt 122, and the printing on surfaces of synchronized encoded chip-cards 118 using a chip-card printer 136, according to one embodiment.

In operation 402, the chip-cards 110 may be automatically fed individually in conveyor canisters 108 of a chip-card encoding array 106 including 'n' number of heterogeneous encoding assemblies 112 communicatively coupled with a chip-card production controller 100 and arranged along a conveyor belt 122 of a chip-card conveyor transport 124 into one of the heterogeneous encoding assemblies 112 at a base of each of the conveyor canisters 108.

In operation 404, a smart chip of each of the chip-cards 110 may be encoded asynchronously and electrically in the conveyor canisters 108 associated with each of the plurality of user accounts 302 through one of the heterogeneous encoding assemblies 112 at the base of each of the conveyor canisters 108.

In operation 406, a magnetic stripe 206 of each of the chip-cards 110 may be encoded asynchronously and magnetically in the conveyor canisters 108 associated with each of the plurality of user accounts 302 through one of the heterogeneous encoding assemblies 112 at the base of each of the conveyor canisters 108.

In operation 408, the encoded chip-cards 118 may be deposited asynchronously in parallel from the 'n' number of heterogeneous encoding assemblies 112 onto the conveyor belt 122 of a chip-card conveyor transport 124 communicatively coupled with the chip-card production controller 100.

In operation 410, the encoded chip-cards may be collected and deposited asynchronously in a parallel manner from the 'n' number of heterogeneous encoding assemblies 112, using the conveyor belt 122 of the chip-card conveyor transport 124.

In operation 412, the encoded chip-cards may be moved asynchronously in a serial manner using the conveyor belt 122 of the chip-card conveyor transport 124 to a chip-card printer 136 communicatively coupled to the chip-card production controller 100.

In operation 414, a particular encoded chip-card 118 may be synchronized with a particular user account 302 using the chip-card printer 136.

In operation 414, a surface of the particular encoded chip-card 118 may be printed using the chip-card printer 136 based on the particular user account 302.

An example embodiment will now be described. YOUR NEIGHBOR Bank in a mid-size town SMALLVILLE in Texas is preparing to launch two new credit cards—the NEIGHBORHOOD FREEDOM VISA® card, and the NEIGHBORHOOD POWER VISA® card. These credit cards are special to YOUR NEIGHBOR Bank because this is the first time that a credit card from a SMALLVILLE bank is an EMV®-compatible chip-card, equipped with an advanced IC for improved security. Such EMV® compatible chip-cards would provide great convenience to YOUR NEIGHBOR Bank customers when they travel because the EMV®-compatible credit cards would be accepted in many countries that embrace the EMV® standards. To be backward compatible, there would still be a magnetic stripe on the chip-cards. And for the first time, taking advantage of the inkjet printing on the flat chip-cards, YOUR NEIGHBOR Bank is using artistic credit card designs with attractive vibrant color which the customers would really like. These appealing chip-cards are the secret weapon of YOUR NEIGHBOR Bank in 2016 to expand its customer base.

To provide customers with maximum convenience and flexibility and partly to compete with the ABC Bank in Smallville, YOUR NEIGHBOR Bank decides to use the heterogeneous chip-card production apparatus described in this invention to print the chip-cards within 2 hours after the customers apply for the credit cards. The heterogeneous chip-card production apparatus used by YOUR NEIGHBOR Bank has an expensive high-speed chip-card printer 136 to print on both surfaces (front and back) of the chip-cards, and 10 less-expensive low-speed heterogeneous encoding assemblies 112 to encode the smart chips 204 and the magnetic stripes 206 of the chip cards 110. As there is sufficient space, the conveyor belt 122 of the chip-card conveyor transport 124 is a bit long with room for future expansion and easy maintenance. This combination allows the expensive chip-card printer 136 to operate at a reasonable utilization rate of 50%, with the remaining 50% reserved capacity for future expansion. The plan is to add 10 more low-speed heterogeneous encoding assemblies over the next 5 years as the customer demand grows over time.

The YOUR NEIGHBOR Bank projects that 70% of customers would apply for the basic NEIGHBORHOOD FREEDOM VISA® chip-card with a beautiful blue design and 30% for the more up-class NEIGHBORHOOD POWER VISA® card with an attractive golden design. Thus they designate 7 heterogeneous encoding assemblies 112 for the blue NEIGHBORHOOD FREEDOM VISA® chip-card 110 and put blank blue chip-cards 110 into the corresponding 7 conveyor canisters 108 with the custom labeling 202 (e.g. including custom labeling pattern 208A of the artistic design) already imprinted. And they designate 3 heterogeneous encoding assemblies 112 for the red NEIGHBORHOOD POWER VISA® chip-card 110 and put blank red chip-cards 110 into the corresponding 3 conveyor canisters 108 with the artistic design patterns and text already imprinted.

Blank chip-cards 110 are fed (using feed 113 in circle "1") from the conveyor canisters 108 to the heterogeneous encoding assemblies 112 of the chip-card encoding array 106. Asynchronous electrical encoding 115 in circle "2" is applied to encode the smart chips 204 of the chip-cards 110. Asynchronous magnetic encoding 117 in circle "3" is applied to encode the magnetic stripes 206 of the chip-cards 110. Heterogeneous verification apparatuses 116 of the chip-card verification array 114 perform verification and reject (using reject 135 in circle "9") any faulty encoded chip-cards 118.

The encoded chip-cards 118 are deposited in parallel (using the parallel asynchronous deposition 121 in circle "4") from the heterogeneous encoding assemblies 112 onto the conveyor belt 122 of the chip-card conveyor transport 124. The encoded chip-cards 118 are moved in a serial manner (using serial asynchronous movement 123 in circle "5") to the chip-card printer 136. Bum turns 126, true edge alignment 128 and turnover station 130 are installed to reposition the encoded chip-cards 118 appropriately as the encoded chip-cards 118 are moved on the conveyor belt 122. Serial verification-registration apparatus 132 performs verification, synchronization and registration of the encoded chip-cards 118. The location 120 of the encoded chip-cards 118 are monitored by the chip-card production controller 100. Faulty encoded chip-cards 118 are rejected (using reject 135 in circle "9"). Encoded chip-cards 118 that are lost (e.g. lost 133 in circle "8") and/or jammed (e.g. jamming 131 in circle "7") are detected by the chip-card production controller 100 as they do not arrive at the chip-card printer 136 within a time period. Such rejected, lost and jammed encoded chip-cards 118 are to be re-made in a later run.

The chip-card printer 136 prints (e.g. using printing 125 in circle "6") on the surfaces (e.g. top face of chip-card 200A and/or bottom face of chip-card 200B) of the encoded chip-cards 118. The UV dryer 138 cures the printed surfaces after the printing 125. Vision-based verification apparatus 134 verifies the correction printing 125 of the customer information on the encoded chip-cards 118 based on the associated user accounts 302.

The chip-card verification array 114, the serial verification-registration apparatus 132 and the vision-based verification apparatus 134 are in place to ensure that there is no blemish 212 on the outer appearance (including custom labeling 202, custom labeling pattern 208A, printed pattern 208B and printed text 210 on the top face of chip-card 200A and the bottom face of chip-card 200B) of the encoded chip-cards 118, and there is consistency among the printed text 210, the magnetic encoded data in the magnetic stripe 206, and the electrical encoded data in the smart chip 204. Encoded chip-cards 118 with blemish 212 are determined to be faulty and are rejected (using reject 135 in circle "9")

When customers apply for the NEIGHBORHOOD FREEDOM VISA® chip-card 110 and the NEIGHBORHOOD POWER VISA® chip-card 110, user accounts 302 are created in the cardholder database 300 for the customers. The chip-card production controller 100 creates associations 304 between the chip-cards 110 with appropriate custom labeling 202 corresponding to the two kinds of VISA® chip-cards 110 and the user accounts 302. The chip-card production controller 100 controls the chip-card encoding array 106, the chip-card conveyor transport 124, the chip-card printer 136 and the various verification apparatus to print the encoded chip-cards 118 to the customers' satisfaction.

Figure 5:
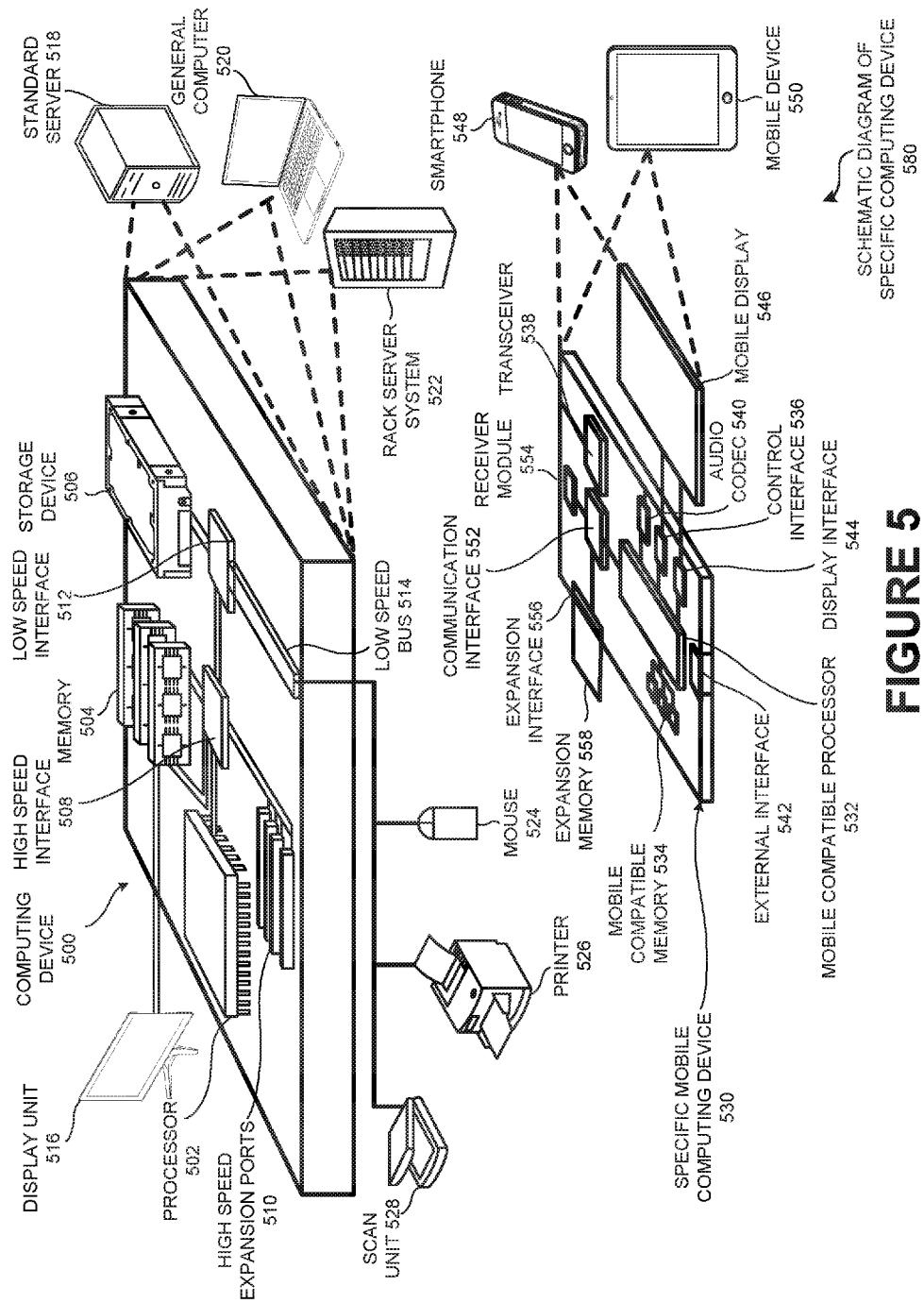
FIG. 5 is a schematic diagram of exemplary data processing that can be used to implement the methods and systems disclosed in FIG. 1, according to one embodiment.

FIG. 5 is a schematic diagram 580 of a computing device 500 and a mobile device 550 that can be used to perform and/or implement any of the embodiments disclosed in FIG. 1, according to one embodiment. The computing device 500 may represent various forms of digital computers, such as laptops, desktops, workstations, personal digital assistants, servers, blade servers, mainframes, and/or other appropriate computers. The mobile device 550 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The computing device 500 may include a processor 502, a memory 504 (e.g., memory 104 of FIG. 1), a storage device 506, a high speed interface 508 coupled to the memory 504 (e.g., memory 104 of FIG. 1) and a plurality of high speed expansion ports 510, and a low speed interface 512 coupled to a low speed bus 514 and a storage device 506. In one embodiment, each of the components heretofore may be inter-coupled using various buses, and may be mounted on a common motherboard and/or in other manners as appropriate. The processor 502 may process instructions for execution in the computing device 500, including instructions stored in the memory 504 (e.g., memory 104 of FIG. 1) and/or on the storage device 506 to display a graphical information for a GUI on an external input/output device, such as a display unit 516 coupled to the high speed interface 508. In other embodiments, multiple processors and/or multiple buses may be used, as appropriate, along with multiple memories and/or types of memory. Also, a plurality of computing device(s) 500 may be coupled with, with each device providing portions of the necessary operations (e.g., as a server bank, a group of blade servers, and/or a multi-processor system).

The memory 504 (e.g., memory 104 of FIG. 1) may be coupled to the computing device 500. In one embodiment, the memory 504 (e.g., memory 104 of FIG. 1) may be a volatile memory. In another embodiment, the memory 504 may be a non-volatile memory. The memory 504 (e.g., memory 104 of FIG. 1) may also be another form of computer-readable medium, such as a magnetic and/or an optical disk. The storage device 506 may be capable of providing mass storage for the computing device 500. In one embodiment, the storage device 506 may be comprised of at least one of a floppy disk device, a hard disk device, an optical disk device, a tape device, a flash memory and/or other similar solid state memory device. In another embodiment, the storage device 506 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 504 (e.g., memory 104 of FIG. 1), the storage device 506, a memory coupled to the processor 502, and/or a propagated signal.

The high speed interface 508 may manage bandwidth-intensive operations for the computing device 500, while the low speed interface 512 may manage lower bandwidth-intensive operations. Such allocation of functions is exemplary only. In one embodiment, the high speed interface 508 may be coupled to at least one of the memory 504 (e.g., memory 104 of FIG. 1), the display unit 516 (e.g., through a graphics processor and/or an accelerator), and to the plurality of high speed expansion ports 510, which may accept various expansion cards. In the embodiment, the low speed interface 512 may be coupled to at least one of the storage device 506 and the low speed bus 514. The low speed bus 514 may be comprised of a wired and/or wireless communication port (e.g., a Universal Serial Bus ("USB"), a Bluetooth® port, an Ethernet port, and/or a wireless Ethernet port). The low speed bus 514 may also be coupled to at least one of scan unit 528, a printer 526, a keyboard, a mouse 524, and a networking device (e.g., a switch and/or a router) through a network adapter.

The computing device 500 may be implemented in a number of different forms, as shown in the figure. In one embodiment, the computing device 500 may be implemented as a standard server 518 and/or a group of such servers. In another embodiment, the computing device 500 may be implemented as part of a rack server system 522. In yet another embodiment, the computing device 500 may be implemented as a general computer 520 such as a laptop or desktop computer. Alternatively, a component from the computing device 500 may be combined with another component in a mobile device 550. In one or more embodiments, an entire system may be made up of a plurality of computing device(s) 500 and/or a plurality of computing device(s) 500 coupled to a plurality of mobile device(s) 550.

In one embodiment, the mobile device 550 may comprise at least one of a mobile compatible processor 532, a mobile compatible memory 534, and an input/output device such as a mobile display 546, a communication interface 552, and a transceiver 538, among other components. The mobile device 550 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 532 may execute instructions in the mobile device 550, including instructions stored in the mobile compatible memory 534. The mobile compatible processor 532 may be implemented as a chipset of chips that include separate and multiple analog and digital processors. The mobile compatible processor 532 may provide, for example, for coordination of the other components of the mobile device 550, such as control of user interfaces, applications run by the mobile device 550, and wireless communication by the mobile device 550.

The mobile compatible processor 532 may communicate with a user through the control interface 536 and the display interface 544 coupled to a mobile display 546. In one embodiment, the mobile display 546 may be at least one of a Thin-Film-Transistor Liquid Crystal Display ("TFT LCD"), an Organic Light Emitting Diode ("OLED") display, and another appropriate display technology. The display interface 544 may comprise appropriate circuitry for driving the mobile display 546 to present graphical and other information to a user. The control interface 536 may receive commands from a user and convert them for submission to the mobile compatible processor 532. In addition, an external interface 542 may be provide in communication with the mobile compatible processor 532, so as to enable near area communication of the mobile device 550 with other devices. External interface 542 may provide, for example, for wired communication in some embodiments, or for wireless communication in other embodiments, and multiple interfaces may also be used.

The mobile compatible memory 534 may be coupled to the mobile device 550. The mobile compatible memory 534 may be implemented as at least one of a volatile memory and a non-volatile memory. The expansion memory 558 may also be coupled to the mobile device 550 through the expansion interface 556, which may comprise, for example, a Single In Line Memory Module ("SIMM") card interface. The expansion memory 558 may provide extra storage space for the mobile device 550, or may also store an application or other information for the mobile device 550. Specifically, the expansion memory 558 may comprise instructions to carry out the processes described above. The expansion memory 558 may also comprise secure information. For example, the expansion memory 558 may be provided as a security module for the mobile device 550, and may be programmed with instructions that permit secure use of the mobile device 550. In addition, a secure application may be provided on the SIMM card, along with additional information, such as placing identifying information on the SIMM card in a non-hackable manner.

The mobile compatible memory 534 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 534, the expansion memory 558, a memory coupled to the mobile compatible processor 532, and a propagated signal that may be received, for example, over the transceiver 538 and/or the external interface 542.

The mobile device 550 may communicate wirelessly through the communication interface 552, which may be comprised of a digital signal processing circuitry. The communication interface 552 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio frequency transceiver. In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 550, which may be used as appropriate by a software application running on the mobile device 550.

The mobile device 550 may also communicate audibly using an audio codec 540, which may receive spoken information from a user and convert it to usable digital information. The audio codec 540 may likewise generate audible sound for a user, such as through a speaker (e.g., in a handset of the mobile device 550). Such a sound may comprise a sound from a voice telephone call, a recorded sound (e.g., a voice message, a music files, etc.) and may also include a sound generated by an application operating on the mobile device 550.

The mobile device 550 may be implemented in a number of different forms, as shown in the figure. In one embodiment, the mobile device 550 may be implemented as a smartphone 548. In another embodiment, the mobile device 550 may be implemented as a personal digital assistant ("PDA"). In yet another embodiment, the mobile device, 550 may be implemented as a tablet device.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A heterogeneous chip-card production apparatus, comprising:
a chip-card production controller with a processor and a memory communicatively coupled with the processor to:
detect a presence of a sequence of chip-cards in a conveyor canister of a chip-card encoding array comprising 'n' number of heterogeneous encoding assemblies arranged along a conveyor belt of a chip-card conveyor transport, and associate one of a plurality of user accounts with each chip-card of the conveyer canister based on a cardholder database and a custom labeling on a face of each chip-card;

the chip-card encoding array comprising the 'n' number of heterogeneous encoding assemblies communicatively coupled to the chip-card production controller to:

automatically feed each of the chip-cards in the conveyor canister and other conveyor canisters into one of the heterogeneous encoding assemblies at a base of each of the conveyor canister and the other conveyor canisters, wherein the chip-cards are differentiated through the custom labeling on the chip-cards, encode asynchronously a smart chip of each of the chip-cards in the conveyor canister and the other conveyor canisters associated with each of the plurality of user accounts through one of the heterogeneous encoding assemblies at the base of each of the conveyor canister and the other conveyor canisters, encode electrically the smart chip of each of the chip-cards in the conveyor canister and the other conveyor canisters associated with each of the plurality of user accounts through one of the heterogeneous encoding assemblies at the base of each of the conveyor canister and the other conveyor canisters, encode asynchronously a magnetic stripe of each of the chip-cards in the conveyor canister and the other conveyor canisters associated with each of the plurality of user accounts through one of the heterogeneous encoding assemblies at the base of each of the conveyor canister and the other conveyor canisters, encode magnetically the magnetic stripe of each of the chip-cards in the conveyor canister and the other conveyor canisters associated with each of the plurality of user accounts through one of the heterogeneous encoding assemblies at the base of each of the conveyor canister and the other conveyor canisters, identify a first faulty chip-card, reject the first faulty chip-card, and deposit asynchronously the encoded chip-cards in parallel onto the conveyor belt of the chip-card conveyor transport;

the chip-card conveyor transport communicatively coupled with the chip-card production controller to:

collect the encoded chip-cards deposited asynchronously in a parallel manner from the 'n' number of heterogeneous encoding assemblies using the conveyor belt, move the encoded chip-cards asynchronously in a serial manner using the conveyor belt to a chip-card printer, identify a second faulty chip-card, reject the second faulty chip-card; and the chip-card printer communicatively coupled to the chip-card production controller to:

receive the encoded chip-cards from the chip-card conveyor transport asynchronously in a serial manner, synchronize a particular encoded chip-card with a particular user account, print on a surface of the particular encoded chip-card based on the particular user account, identify a third faulty chip-card, and reject the third faulty chip-card.

2. The heterogeneous chip-card production apparatus in claim 1, further comprising:

the chip-card production controller further to:

count a number of chip-cards in the conveyor canister and other conveyor canisters associated with the 'n' number of heterogeneous encoding assemblies;

the chip-card encoding array further to:

utilize a first 'n' number of independent and asynchronous timing protocols for the 'n' number of heterogeneous encoding assemblies in which electrical encoding operations of one encoding assembly to commence independent of other encoding assemblies at a first rate independent of other encoding assemblies, utilize a second 'n' number of independent and asynchronous timing protocols for the 'n' number of heterogeneous encoding assemblies in which magnetic encoding operations of one encoding assembly to commence independent of other encoding assemblies at a second rate independent of other encoding assemblies, utilize a third 'n' number of independent and asynchronous timing protocols for the 'n' number of heterogeneous encoding assemblies in which depositing operations of one heterogeneous encoding assembly to commence independent of other encoding assemblies at a third rate independent of other encoding assemblies, and identify faulty chip-cards using a parallel verification process; and the chip-card conveyor transport further to:

identify faulty chip-cards using a serial verification-registration process, increment a counter when one of the chip-cards is determined to be faulty, move the encoded chip-cards to the chip-card printer other than those that are at least one of:

determined to be faulty, jammed, and lost in transport, and utilize a fourth timing protocol in which the encoded chip-cards reach the chip-card printer in a serial manner asynchronously at irregular time intervals.

3. The heterogeneous chip-card production apparatus of claim 1, further comprising:

a chip-card verification array, comprising 'n' number of heterogeneous verification apparatuses associated with the 'n' number of heterogeneous encoding assemblies, communicatively coupled with the chip-card production controller to perform a parallel verification process, before the encoded chip-cards are deposited onto the conveyor belt, by at least one of:

communicating asynchronously with the smart chips of the encoded chip-cards, verifying asynchronously electrical encoded data in the smart chips of the encoded chip-cards based on the associated user accounts, reading asynchronously the magnetic stripes of the encoded chip-cards, verifying asynchronously magnetic encoded data in the magnetic stripes of the encoded chip-cards based on the associated user accounts, verifying asynchronously that the electrical encoded data and the magnetic encoded data are consistent based on the associated user accounts, and determining asynchronously any encoded chip-cards failing any verification to be faulty; and a serial verification-registration apparatus communicatively coupled with the chip-card production controller to perform a serial verification-registration process after the encoded chip-cards are deposited onto the conveyor belt by:
- at least one of reading the magnetic stripes of the encoded chip-cards and communicating with the smart chips of the encoded chip-cards as the encoded chip-cards are moved by the conveyor belt asynchronously with irregular spacing and irregular time interval between consecutive encoded chip-cards,
- identifying the associated user accounts based on at least one of the magnetic encoded data in the magnetic stripes and the electrical encoded data in the smart chips,
- registering the encoded chip-cards based on the associated user accounts, and
- determining any encoded chip-cards failing the registration to be faulty.

4. The heterogeneous chip-card production apparatus of claim 1, further comprising:
the chip-card production controller further to:
- track physical locations of the encoded chip-cards, and
- re-identify the encoded chip-cards as the encoded chip-cards are moved on the conveyor belt based on a registration of the encoded chip-cards;

the chip-card conveyor transport further to at least one of:
- rotate the encoded chip-cards horizontally by an angle relative to the conveyor belt using at least one bum turn,
- align the encoded chip-cards against a reference edge of the conveyor belt, and
- flip the encoded chip-cards upside down using a turnover station; and the chip-card printer further to:
- synchronize the particular encoded chip-card with the particular user account based on a registration of the particular encoded chip-card, and
- cure the printed surface of the particular encoded chip-card with UV (ultra-violet) light after the printing.

5. The heterogeneous chip-card production apparatus of claim 1, further comprising:
a vision-based verification apparatus communicatively coupled with the chip-card production controller to:
- capture images of the encoded chip-cards using a camera system after the printing by the chip-card printer,
- verify the appearance of the encoded chip-cards and the printing by the chip-card printer based on computer vision applied to the captured images and the associated user accounts,
- determine printed text, patterns and custom labeling on the encoded chip-cards by performing at least one of OCR (optical character recognition) and bar-code extraction on the captured images,
- verify the printed text, the patterns and the custom labeling on the encoded chip-cards based on the associated user accounts,
- ensure data integrity by synchronizing the printed text, the patterns and the custom labeling with magnetic encoded data of the magnetic stripes and electrical encoded data of the smart chips of the encoded chip-cards, and
- reject any encoded chip-cards with blemish in at least one of the printed text, the patterns, the custom labeling, the magnetic encoded data and the electrical encoded data.

6. The heterogeneous chip-card production apparatus of claim 1, wherein:
at least one of the following occurs:
- a first encoded chip-card ceases to reach the chip-card printer because of at least one of:
  - rejection due to unsuccessful communication with a first smart chip of the first encoded chip-card,
  - rejection due to unsuccessful encoding of the first smart chip,
  - rejection due to unsuccessful encoding of a first magnetic stripe of the first encoded chip-card,
  - halted operation due to unsuccessful communication with the chip-card production controller,
  - halted operation due to unavailability of a first associated user account,
  - jamming of the first encoded chip-card, and
  - getting lost of the first encoded chip-card in transport, and
- a second encoded chip-card is rejected based on at least one of:
  - rejection of the second encoded chip-card by a chip-card verification array,
  - rejection by a serial verification-registration apparatus,
  - rejection by a vision-based verification apparatus,
  - rejection by the chip-card production controller,
  - jamming of the second encoded chip-card, and
  - getting lost of the second encoded chip-card in transport.

7. The heterogeneous chip-card production apparatus of claim 1, further comprising:
- at least one heterogeneous encoding assembly halted and removed asynchronously from the chip-card encoding array while the other heterogeneous encoding assemblies, the chip-card production controller, the conveyor transport and the chip-card printer remain in operation,
- at least one new heterogeneous encoding assembly added to the chip-card encoding array and commenced asynchronously while the 'n' number of heterogeneous encoding assemblies of the chip-card encoding array, the chip-card production controller, the chip-card conveyor transport, and the chip-card printer remain in operation, and
- at least one of the 'n' number of heterogeneous encoding assemblies modified asynchronously on the fly while the other heterogeneous encoding assemblies, the chip-card production controller, the chip-card conveyor transport, and the chip-card printer remain in operation, wherein the modification is at least one of: slowing down, speeding up, halting, resuming, turning on, turning off, multi-tasking, replenishing, rebooting, software upgrade, software update, and an other operation.

8. A heterogeneous chip-card production apparatus, comprising:
a chip-card encoding array comprising 'n' number of heterogeneous encoding assemblies arranged along a conveyor belt of a chip-card conveyor transport and communicatively coupled to a chip-card production controller to:
- automatically feed chip-cards in conveyor canisters of the chip-card encoding array individually into one of the heterogeneous encoding assemblies at a base of each of the conveyor canisters using a processor and a memory of the chip-card production controller, wherein the chip-cards are differentiated through custom labeling on a face of each of the chip-cards, wherein one of a plurality of user accounts is associated with each of the chip-cards based on a cardholder database and the custom labeling, encode asynchronously and electrically a smart chip of each of the chip-cards in the conveyor canisters associated with each of the plurality of user accounts through one of the heterogeneous encoding assemblies at the base of each of the conveyor canisters, encode asynchronously and magnetically a magnetic stripe of each of the chip-cards in the conveyor canisters associated with each of the plurality of user accounts through one of the heterogeneous encoding assemblies at the base of each of the conveyor canisters, and deposit asynchronously the encoded chip-cards in parallel onto the conveyor belt of the chip-card conveyor transport;

a chip-card printer communicatively coupled to the chip-card production controller to:

synchronize a particular encoded chip-card transported asynchronously in a serial manner from the chip-card encoding array using the conveyor belt of the chip-card conveyor transport with a particular user account, and print on a surface of the particular encoded chip-card based on the particular user account; and whereas encoded chip-cards determined to be faulty are rejected.

9. The heterogeneous chip-card production apparatus in claim 8, further comprising:

the chip-card production controller to:

detect a presence of and count a number of the chip-cards in the conveyor canisters associated with the 'n' number of heterogeneous encoding assemblies;

the chip-card encoding array further to:

utilize a first 'n' number of independent and asynchronous timing protocols for the 'n' number of heterogeneous encoding assemblies in which electrical encoding operations of one encoding assembly to commence independent of other encoding assemblies at a first rate independent of other encoding assemblies, utilize a second 'n' number of independent and asynchronous timing protocols for the 'n' number of heterogeneous encoding assemblies in which magnetic encoding operations of one encoding assembly to commence independent of other encoding assemblies at a second rate independent of other encoding assemblies, utilize a third 'n' number of independent and asynchronous timing protocols for the 'n' number of heterogeneous encoding assemblies in which depositing operations of one heterogeneous encoding assembly to commence independent of other encoding assemblies at a third rate independent of other encoding assemblies, and identify faulty chip-cards using a parallel verification process; and the chip-card conveyor transport further to:

identify faulty chip-cards using a serial verification-registration process, increment a counter when one of the chip-cards is determined to be faulty, move the encoded chip-cards to the chip-card printer other than those that are at least one of:

determined to be faulty, jammed, and lost in transport, and utilize a fourth timing protocol in which the encoded chip-cards reach the chip-card printer in a serial manner asynchronously at irregular time intervals.

10. The heterogeneous chip-card production apparatus of claim 8, further comprising:

a chip-card verification array, comprising 'n' number of heterogeneous verification apparatuses associated with the 'n' number of heterogeneous encoding assemblies, communicatively coupled with the chip-card production controller to perform a parallel verification process, before the encoded chip-cards are deposited onto the conveyor belt, by at least one of:

communicating with the smart chips of the encoded chip-cards, verifying electrical encoded data in the smart chips of the encoded chip-cards based on the associated user accounts, reading the magnetic stripes of the encoded chip-cards, verifying magnetic encoded data in the magnetic stripes of the encoded chip-cards based on the associated user accounts, verifying that the electrical encoded data and the magnetic encoded data are consistent based on the associated user accounts, and determining any encoded chip-cards failing any verification to be faulty; and a serial verification-registration apparatus communicatively coupled with the chip-card production controller to perform a serial verification-registration process after the encoded chip-cards are deposited onto the conveyor belt by:

at least one of reading the magnetic stripes of the encoded chip-cards and communicating with the smart chips of the encoded chip-cards as the encoded chip-cards are moved by the conveyor belt, identifying the associated user accounts based on at least one of the magnetic encoded data in the magnetic stripes and the electrical encoded data in the smart chips, registering the encoded chip-cards based on the associated user accounts, and determining any encoded chip-cards failing the registration to be faulty.

11. The heterogeneous chip-card production apparatus of claim 8, further comprising:

the chip-card production controller to:

track physical locations of the encoded chip-cards, and re-identify the encoded chip-cards as the encoded chip-cards are moved on the conveyor belt based on a registration of the encoded chip-cards;

the chip-card conveyor transport further to at least one of:

rotate the encoded chip-cards horizontally by an angle relative to the conveyor belt using at least one bum turn, align the encoded chip-cards against a reference edge of the conveyor belt, and flip the encoded chip-cards upside down using a turn-over station; and the chip-card printer further to:

identify the encoded chip-cards from the conveyor-belt based on the associated user accounts and the registration of the encoded chip-cards, and cure the printed surfaces with UV (ultra-violet) light after the printing.

12. The heterogeneous chip-card production apparatus of claim 8, further comprising:
a vision-based verification apparatus communicatively coupled with the chip-card production controller to:
capture images of the encoded chip-cards using a camera system after the printing by the chip-card printer,
verify the appearance of the encoded chip-cards and the printing by the chip-card printer based on computer vision applied to the captured images and the associated user accounts,
determine printed text and patterns on the encoded chip-cards by performing at least one of OCR (optical character recognition) and bar-code extraction on the captured images,
verify the printed text, the patterns and the custom labeling on the encoded chip-cards based on the associated user accounts,
ensure data integrity by synchronizing the printed text, the patterns and the custom labeling with magnetic encoded data of the magnetic stripes and electrical encoded data of the smart chips of the encoded chip-cards, and
reject any encoded chip-cards with blemish in at least one of the printed text, the patterns, the custom labeling, the magnetic encoded data and the electrical encoded data.

13. The heterogeneous chip-card production apparatus of claim 8, wherein:
at least one of the following occurs:
a first encoded chip-card ceases to reach the chip-card printer because of at least one of:
rejection due to unsuccessful communication with a first smart chip of the first encoded chip-card,
rejection due to unsuccessful encoding of the first smart chip,
rejection due to unsuccessful encoding of a first magnetic stripe of the first encoded chip-card,
halted operation due to unsuccessful communication with the chip-card production controller,
halted operation due to unavailability of a first associated user account,
jamming of the first encoded chip-card, and
getting lost of the first encoded chip-card in transport; and
a second encoded chip-card is rejected based on at least one of:
rejection of the second encoded chip-card by a chip-card verification array,
rejection by a serial verification-registration apparatus,
rejection by a vision-based verification apparatus,
rejection by the chip-card production controller,
jamming of the second encoded chip-card, and
getting lost of the second encoded chip-card in transport.

14. The heterogeneous chip-card production apparatus of claim 8, wherein at least one of the following occurs:
at least one heterogeneous encoding assembly is halted and removed asynchronously from the chip-card encoding array while the other heterogeneous encoding assemblies, the chip-card production controller, the conveyor transport and the chip-card printer remain in operation,
at least one new heterogeneous encoding assembly is added to the chip-card encoding array and commenced asynchronously while the 'n' number of heterogeneous encoding assemblies of the chip-card encoding array, the chip-card production controller, the chip-card conveyor transport, and the chip-card printer remain in operation, and
at least one of the 'n' number of heterogeneous encoding assemblies is modified asynchronously on the fly while the other heterogeneous encoding assemblies, the chip-card production controller, the chip-card conveyor transport, and the chip-card printer remain in operation, wherein the modification is at least one of: slowing down, speeding up, halting, resuming, turning on, turning off, multi-tasking, replenishing, rebooting, software upgrade, software update, and an other operation.

15. A method of a heterogeneous chip-card production apparatus, comprising:
automatically feeding chip-cards individually in conveyor canisters of a chip-card encoding array comprising 'n' number of heterogeneous encoding assemblies communicatively coupled with a chip-card production controller and arranged along a conveyor belt of a chip-card conveyor transport into one of the heterogeneous encoding assemblies at a base of each of the conveyor canisters,
wherein the chip-cards are differentiated through custom labeling on a face of each of the chip-cards, and
wherein one of a plurality of user accounts is associated with each of the chip-cards based on a cardholder database and the custom labeling;
encoding asynchronously and electrically a smart chip of each of the chip-cards in the conveyor canisters associated with each of the plurality of user accounts through one of the heterogeneous encoding assemblies at the base of each of the conveyor canisters;
encoding asynchronously and magnetically a magnetic stripe of each of the chip-cards in the conveyor canisters associated with each of the plurality of user accounts through one of the heterogeneous encoding assemblies at the base of each of the conveyor canisters;
depositing asynchronously the encoded chip-cards in parallel from the 'n' number of heterogeneous encoding assemblies onto the conveyor belt of the chip-card conveyor transport communicatively coupled with the chip-card production controller;
rejecting any encoded chip-cards determined to be faulty;
collecting the encoded chip-cards, deposited asynchronously in a parallel manner from the 'n' number of heterogeneous encoding assemblies, using the conveyor belt of the chip-card conveyor transport;
moving the encoded chip-cards asynchronously in a serial manner using the conveyor belt of the chip-card conveyor transport to a chip-card printer communicatively coupled to the chip-card production controller;
synchronizing a particular encoded chip-card with a particular user account using the chip-card printer; and
printing on a surface of the particular encoded chip-card using the chip-card printer based on the particular user account.

16. The method of the heterogeneous chip-card production apparatus in claim 15, further comprising:
detecting a presence of and count a number of the chip-cards in the conveyor canisters associated with the 'n' number of heterogeneous encoding assemblies;

utilizing a first 'n' number of independent and asynchronous timing protocols for the 'n' number of heterogeneous encoding assemblies of the chip-card encoding array in which electrical encoding operations of one encoding assembly to commence independent of other encoding assemblies at a first rate independent of other encoding assemblies;

utilizing a second 'n' number of independent and asynchronous timing protocols for the 'n' number of heterogeneous encoding assemblies in which magnetic encoding operations of one encoding assembly to commence independent of other encoding assemblies at a second rate independent of other encoding assemblies;

utilizing a third 'n' number of independent and asynchronous timing protocols for the 'n' number of heterogeneous encoding assemblies in which depositing operations of one heterogeneous encoding assembly to commence independent of other encoding assemblies at a third rate independent of other encoding assemblies;

identifying faulty chip-cards using at least one of a parallel verification process and a serial verification-registration process;

incrementing a counter when one of the chip-cards is determined to be faulty;

moving the encoded chip-cards to the chip-card printer other than those that are at least one of: determined to be faulty, jammed, and lost in transport; and utilizing a fourth timing protocol in which the encoded chip-cards reach the chip-card printer in a serial manner asynchronously at irregular time intervals.

17. The method of the heterogeneous chip-card production apparatus of claim 15, further comprising:

performing a parallel verification process using a chip-card verification array comprising 'n' number of heterogeneous verification apparatuses associated with the 'n' number of heterogeneous encoding assemblies and communicatively coupled with the chip-card production controller before the encoded chip-cards are deposited onto the conveyor belt, by at least one of:
  communicating with the smart chips of the encoded chip-cards,
  verifying electrical encoded data in the smart chips of the encoded chip-cards based on the associated user accounts,
  reading the magnetic stripes of the encoded chip-cards,
  verifying magnetic encoded data in the magnetic stripes of the encoded chip-cards based on the associated user accounts,
  verifying that the electrical encoded data and the magnetic encoded data are consistent based on the associated user accounts, and
  determining any encoded chip-cards failing any verification to be faulty; and performing a serial verification-registration process using a serial verification-registration apparatus communicatively coupled with the chip-card production controller after the encoded chip-cards are deposited onto the conveyor belt by:
  at least one of reading the magnetic stripes of the encoded chip-cards and communicating with the smart chips of the encoded chip-cards as the encoded chip-cards are moved by the conveyor belt,
  identifying the associated user accounts based on at least one of the magnetic encoded data in the magnetic stripes and the electrical encoded data in the smart chips,
  registering the encoded chip-cards based on the associated user accounts, and
  determining any encoded chip-cards failing the registration to be faulty.

18. The method of the heterogeneous chip-card production apparatus of claim 15, further comprising:
  tracking physical locations of the encoded chip-cards;
  re-identifying the encoded chip-cards as the encoded chip-cards are moved on the conveyor belt using the chip-card production controller based on a registration of the encoded chip-cards;
  rotating the encoded chip-cards horizontally by an angle relative to the conveyor belt using at least one bum turn of the conveyor belt of the chip-card conveyor transport;
  aligning the encoded chip-cards against a reference edge of the conveyor belt;
  flipping the encoded chip-cards upside down using a turnover station of the chip-card conveyor transport;
  identifying the encoded chip-cards from the conveyor-belt using the chip-card printer based on the associated user accounts and the registration of the encoded chip-cards; and
  curing the printed surfaces of the encoded chip-cards with UV (ultra-violet) light after the printing of the chip-card printer.

19. The method of the heterogeneous chip-card production apparatus of claim 15, further comprising:
  capturing images of the encoded chip-cards using a camera system of a vision-based verification apparatus communicatively coupled to the chip-card production controller after the printing by the chip-card printer;
  verifying the appearance of the encoded chip-cards and the printing by the chip-card printer based on computer vision applied to the captured images and the associated user accounts using the vision-based verification apparatus communicatively coupled with the chip-card production controller;
  determining printed text and patterns on the encoded chip-cards by performing at least one of OCR (optical character recognition) and bar-code extraction on the captured images;
  verifying the printed text, the patterns and the custom labeling on the encoded chip-cards based on the associated user accounts;
  ensuring data integrity by synchronizing the printed text, the patterns and the custom labeling with magnetic encoded data of the magnetic stripes and electrical encoded data of the smart chips of the encoded chip-cards; and
  rejecting any encoded chip-cards with blemish in at least one of the printed text, the patterns, the custom labeling, the magnetic encoded data and the electrical encoded data.

20. The method of the heterogeneous chip-card production apparatus of claim 15, further comprising at least one of:
  halting and removing at least one heterogeneous encoding assembly asynchronously from the chip-card encoding array while the other heterogeneous encoding assemblies, the chip-card production controller, the conveyor transport and the chip-card printer remain in operation;
  adding to the chip-card encoding array and commencing asynchronously at least one new heterogeneous encoding assembly while the 'n' number of heterogeneous encoding assemblies of the chip-card encoding array, the chip-card production controller, the chip-card conveyor transport, and the chip-card printer remain in operation; and modifying at least one of the 'n' number of heterogeneous encoding assemblies asynchronously on the fly while the other heterogeneous encoding assemblies, the chip-card production controller, the chip-card conveyor transport, and the chip-card printer remain in operation, wherein the modification is at least one of: slowing down, speeding up, halting, resuming, turning on, turning off, multi-tasking, replenishing, rebooting, software upgrade, software update, and an other operation.

\* \* \* \* \*